(12) United States Patent
Fawcett et al.

(10) Patent No.: US 10,863,246 B2
(45) Date of Patent: Dec. 8, 2020

(54) NETWORK SERVICES PLATFORM SYSTEMS, METHODS, AND APPARATUS

(71) Applicant: EventStream, Inc., Burien, WA (US)

(72) Inventors: John W Fawcett, Burien, WA (US); Julie Fawcett, Burien, WA (US); Thomas Fawcett, Covington, WA (US)

(73) Assignee: EVENTSTREAM, INC., Burien, WA (US)

( * ) Notice: Subject to any disclaimer, the term of this patent is extended or adjusted under 35 U.S.C. 154(b) by 0 days.

(21) Appl. No.: 16/684,417

(22) Filed: Nov. 14, 2019

(65) Prior Publication Data

US 2020/0177965 A1 Jun. 4, 2020

Related U.S. Application Data

(60) Provisional application No. 62/767,133, filed on Nov. 14, 2018.

(51) Int. Cl.
| | |
|---|---|
| *H04N 21/6334* | (2011.01) |
| *H04N 21/258* | (2011.01) |
| *H04N 21/64* | (2011.01) |
| *H04N 21/436* | (2011.01) |
| *H04N 21/63* | (2011.01) |
| *H04N 21/236* | (2011.01) |

(52) U.S. Cl.
CPC ....... *H04N 21/6334* (2013.01); *H04N 21/236* (2013.01); *H04N 21/25816* (2013.01); *H04N 21/436* (2013.01); *H04N 21/632* (2013.01); *H04N 21/64* (2013.01)

(58) Field of Classification Search
CPC ........... H04N 21/236; H04N 21/25816; H04N 21/436; H04N 21/632; H04N 21/6334; H04N 21/64
USPC .......................................................... 725/25
See application file for complete search history.

(56) References Cited

U.S. PATENT DOCUMENTS

| | | |
|---|---|---|
| 2008/0072057 A1 | 3/2008 | Zhang et al. |
| 2017/0353765 A1 | 12/2017 | Frusina et al. |
| 2018/0176608 A1 | 6/2018 | Anwar et al. |
| 2018/0191666 A1* | 7/2018 | Rahman .............. H04L 61/1511 |

FOREIGN PATENT DOCUMENTS

| | | |
|---|---|---|
| CN | 107438186 A | 12/2017 |
| KR | 20090113096 A | 10/2009 |

* cited by examiner

*Primary Examiner* — Dominic D Saltarelli
(74) *Attorney, Agent, or Firm* — AEON Law; Adam L. K. Philipp; Martin Spencer Garthwaite

(57) ABSTRACT

Methods, apparatus, and system to provide network services, including to manage and or produce a media stream, including by a party who is in a location that is remote relative to the live media streaming apparatus, and including to provide the network services to users of a local area network ("LAN"), including users of the LAN who may not have an Internet connection, as well as to users who connect with the network service over a wide area network, such as the Internet.

17 Claims, 11 Drawing Sheets

NETWORK SERVICES PLATFORM SYSTEMS, METHODS, AND APPARATUS

CROSS-REFERENCE TO RELATED APPLICATIONS

This United States non-provisional patent application is a non-provisional of, claims the benefit of the filing date of, and incorporates by this reference the subject matter of U.S. provisional patent application, 62/767,133, filed on Nov. 14, 2018.

FIELD

The present disclosure relates to a computing apparatus, in particular to, a computing apparatus to create a local area network ("LAN") and to provide services, including video services, to other computing devices through the LAN and through networks connected to the LAN.

BACKGROUND

Some existing services to produce and stream live media include GoToMeeting™, Zoom™, GoToWebinar™, classroom software, and "free" or advertiser supported streaming services (such as YouTube Live™, Twitch™, Google Hangouts™, Crowdcast.io™, and the like). Services such as these have at least the following issues:

They may require that media be captured by a camera or microphone in a host computer which generates and/or controls the resulting stream. It may not be possible for the host computer or control station to use a remote source nor to switch between media sources. In those cases where it may be possible to use remote sources or to switch between media sources, the host computer or control station may be required to remain open and operating and the operator may be required to remain with and attend to the host computer or control station; for example, it may not be possible for an operator to "close" a host laptop and operate it remotely to control an external camera. Requiring a human presence at the host computer or control station may cause problems. For example, if the host computer or control station is in a visible location at an event, then the operator of the host computer will i) be visible and ii) will take up space.

Similarly, existing services may only allow use of a single streaming service (a backend service which streams captured media to clients) which is "built into" or provisioned with the host computer or hosting service. Similarly, existing services may require that consumers of a media stream login through the provider of the service; the producer of the media stream may not be free to select one or more different backend streaming service providers and may not be free to arrange downstream resellers or downstream distributors of the media stream who are not also locked into using the "built in" streaming service provider. For example, all users of an existing streaming service may be required to pay the streaming service based on a number of users or according to a subscription model, rather than, for example, an amount of time, a bandwidth of a stream, or with no charge. Existing streaming services may allow recordings to be made, but only in low resolution and or only on the host computer.

Existing streaming services require a connection to the Internet to operate and cannot produce a live stream or record from a location which lacks an Internet connection. Existing streaming services do not create a local area network (LAN) and do not use the LAN to connect to media recording devices and record media which may be streamed.

Existing streaming services simplify the design and architecture of the resulting streaming service, but the service is a service, not a physical product or apparatus.

Existing streaming services often require that a stream conform to specific protocols and architectures, but do not supply either the software or hardware necessary to produce the streams. There may be vendors who supply various components of various capability, complexity, and price, pre-configured to work with other specific hardware and/or software; however, these systems may be completely locked into a single vendor or a small group of vendors and may not have tight coupling with a streaming service.

Existing streaming services may not provide a reservation system which allows a producer of a stream to resell through downstream reselllers.

Existing streaming services simplify the design and architecture of the resulting streaming service but restrict choices of a party who might use such services to produce a live media stream.

DETAILED DESCRIPTION

Figure 1:
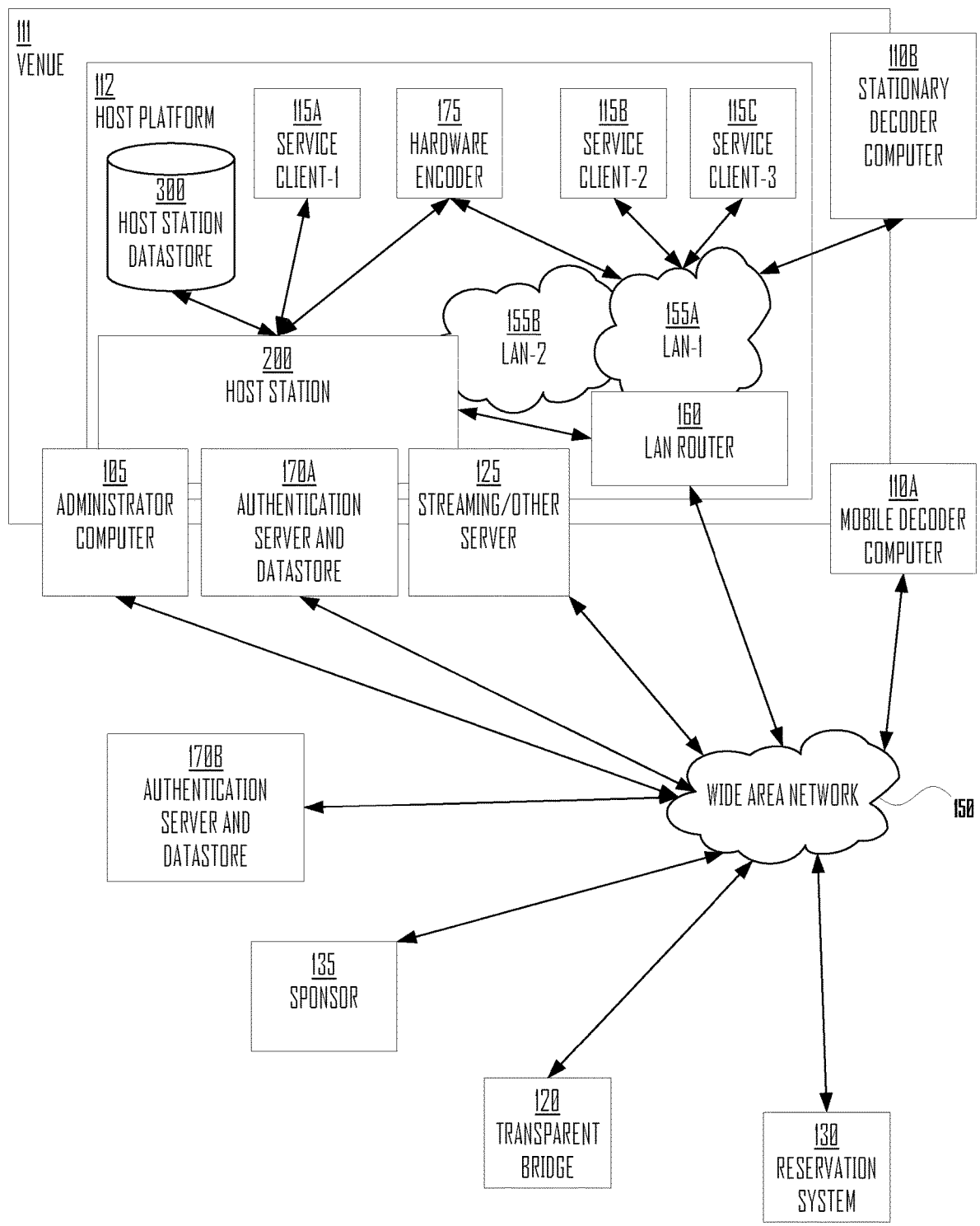
FIG. 1 is a network and device diagram illustrating an example of Host Station Computer (also referred to herein as "Host Station"), Host Station Datastore, Service Clients, Local Area Networks, LAN Router (together, also referred to herein as "Host Platform"), Wide Area Network, Authentication Server and Datastore, Administrator Computer, Decoder Computer, Sponsor, Transparent Bridge, Reservation System, and Streaming Service Provider computer devices incorporated with teachings of the present disclosure, according to some embodiments.

In addition to other locations, defined terms may be found at the end of this Detailed Description.

In overview, this disclosure relates to an apparatus, systems, and methods performed by and in one or more computer device apparatuses to create a flexible host platform to provide services. In embodiments, an apparatus to create the flexible host platform comprises a network module, a service module, and an authorization module. In embodiments, the network module creates a network and dynamically controls connection by service clients with the service module through the network. In embodiments, network module or another module may also configure an authorization module with information of a service to be provided by the service module, such as with an identifier or address of a host service, a streaming server, and other information which may be needed to allow the service module and other computers to connect to the service.

In embodiments, the service clients provide data and/or instructions to the service module; in embodiments, the service module obtains and processes data from service clients, which data or result thereof is then output by the service module to, for example, a streaming server which may provide a media stream to end users or viewers. In embodiments, the authorization module is configured to authorize administrator(s), act as a hub to distribute connection information of the streaming server or host service to the service module and other computers (which connection information may be provided by the network module), and to allow a producer of the media stream to delegate authority to downstream parties to resell the media stream and to provide additional services which may be related to the media stream.

By way of example, the service clients may comprise, for example, media capture devices and media production devices, such as microphones, still and video cameras, drones, lights, and actuators. The service clients may already be present in a venue or may be brought to the venue by an operator of the host platform. By way of example, a service client may be controlled by one or both of the network module and/or the service module and/or another service client controlled by such module(s), which may enable, for example, remote control of service client(s) by a wide range of computer devices.

In legacy systems, when a network host forms a network, the network host and processes executed on a computer of the network host are not normally discoverable as targets on the network. To allow the network host and its processes to be discoverable as a network target, and to allow the network host to manage names and IP addresses of its own processes and of computers and processes which connect to the network, such as the service clients, the disclosed network module creates a network comprising two LANs. The first LAN is created in pass-through mode; i.e. without providing domain name addressing services and dynamic host control protocol services to members of the first LAN. The network module may connect the first LAN with an external network, such as the Internet. The disclosed network module also creates a second LAN with a second network interface and connects the second LAN to the first LAN; the disclosed network module then causes the second network interface and second LAN to provide domain name addressing services and dynamic host control protocol services to members of the first LAN, including the network host and service clients.

In this way, the network module of the host platform can allow the service module to be discoverable on the first LAN and can control connection of service clients and other computers to the streaming service module through the domain name addressing services and dynamic host control protocol services provided by the second network interface. In this way, the host platform and its service module may obtain data from, interact with, and/or control or be controlled by a wide range of service clients and other computers, without the service clients or other computers having to execute customized software. In this way, the host platform does not "lock" a user into using specific service clients or other computers, but allows a great deal of flexibility.

In addition, in embodiments, the host platform may provide streaming services. The streaming services may include a streaming server which streams media, either in real-time or pre-recorded, to users, viewers, or consumers (generally referred to herein as "viewers"). In many legacy streaming services, a streaming service provider and such party's streaming server is "built in" to the streaming service. Users of such legacy streaming services may not select a different streaming service provider nor may they provide their own streaming server. Rather, users of such systems are limited in their choice of streaming service provider, which often carries with it an obligation to pay the streaming service provider according to terms set by the streaming service provider. Fees for such services may be per-stream, per-viewer, and/or based on a bit rate of a stream, though seldom, if ever, do such streaming service providers offer a range of options to their customers. In contrast, in the disclosed host platform, the user of the host platform may provide a streaming server in the host platform and/or may use one or more external streaming servers, including third-party streaming services. In this way the user of the host platform has a great deal of flexibility with respect to provisioning or obtaining streaming services.

In embodiments, control of the network module, service module, and the host platform and use of services made possible thereby may be mediated through or by credentials, including credentials used at an authentication/identity level and or an authorization/access control level. In embodiments, the host platform may utilize a hierarchical authorization server network to authenticate and/or authorize an administrator (who may control the host platform) or user credentials with respect to control of the host platform and to act as a directory and coordinator with respect to services offered by the service module. By way of example, the hierarchical authorization server network may comprise a tiered representation state transfer (REST) server network. By way of example, the hierarchical authorization server network may act as a directory for other modules and computers to access the service and addresses of modules and computers used by or embodying the service. As with other elements of the disclosure herein, the hierarchical authorization server network allows the user, administrator, or operator of the host platform a great deal of flexibility with respect to permissions, payments, time periods, and the like. For example, an administrator may setup a top-level of the hierarchical authorization server network with a top level of authorization criteria and may delegate authorization to sub-levels, such that sub-levels may provide additional services and/or require additional authorization criteria, such as soliciting or accepting reservations, charging fees, and sending invitations to utilize services offered by the service module, such as streaming services. Provided top level of authorization criteria are met, lower levels may operate independently. In this way, a user or operator of the host platform may charge a base fee (or no fee), provide a base level of service, and may allow resellers or other downstream users to charge different or additional fees and provide different or additional services.

In this way, the host platform system may be brought to an area, such as a venue, may be setup, and may, utilizing the network module, rapidly establish a network. The network module may be used to flexibly connect the host platform system with service clients deployed by the operator of the host platform or with service clients already present in the venue. When the network is provided with Internet access, the service clients may connect with the host platform via the Internet from within the venue or from remote locations. In this way, the service module of the host platform may be configured to provide streaming services, including streaming services utilizing a streaming server provided within the host platform, provided external to the host platform by the operator of the host platform, or provided by a third party.

In this way, the host platform may provide a flexible and extensible system, may enable a wide range of services and business models, though without overwhelming the operator of the host platform with too many choices. For example, the host platform may be used by an administrator or producer (hereinafter, "administrator") to capture, produce, and stream media at an event to consumers of the streaming media, where the consumers may be authorized and or authenticated by the administrator and or downstream delegees of the administrator. For example, the host platform may be used by an administrator to receive media at a dedicated hardware encoder and stream such media to a channel of a streaming media system, wherein decoders of the channel may be provided by the administrator and or downstream delegees thereof.

FIG. 1 is a network and device diagram illustrating an example of Host Station Computer 200 ("Host Station 200"), and Host Station Computer Datastore 300 ("Host Station Datastore 300"), Service Client-1 115A, Service Client-2 115B, Service Client-3 115C (referred to collectively as Service Client 115), Local Area Network-1 or LAN-1 155A, Local Area Network-2 or LAN-2 155B (referred to together as "LAN 155" or as "network"), LAN Router 160, Venue 111, Wide Area Network 150 ("WAN 150" or as "Internet"), Authentication Server and Datastore 170A and Authentication Server and Datastore 170B (either, a "REST Server and Datastore 170" and, together, "Authentication Server Network" or "REST Server Network"), Hardware Encoder 175, Administrator Computer 105, Mobile Decoder Computer 110A, Stationary Decoder Computer 110B (either, a "Decoder Computer 110"), Sponsor 135, Transparent Bridge Computer 120, Reservation System 130, Streaming/Other Server 125 ("Streaming Server 125"), according to some embodiments.

The computers and networks of FIG. 1 may be configured and or used as follows:

Equipment Setup and Logical Connections

A carrying container, case, briefcase, backpack or the like containing Host Station 200, Host Station Datastore 300, Service Client 115, and LAN Router 160 may be brought by a camera operator or Site Technician (hereinafter, "Site Technician") to a venue, such as Venue 111, where, for example, an event is to take place or media is desired to be streamed (hereinafter, "Event"). Venue 111 may be a location, such as a building, a room, a theater, a field, a forest, a location with a pond, a pond comprising frogs, or the like. Venue 111 may or may not comprise access to a wide area network, such as access to WAN 150. WAN 150 may be, for example, the Internet.

The Site Technician may remove the aforesaid computer devices from the carrying case and, if they are not already connected and operating, connect them and start them up. In embodiments, LAN Router 160 may require a wireline connection to Host Station 200; in embodiments, one or more of Service Client 115 may be connected to Host Station 200 via a wireline connection, such as a Universal Serial Bus ("USB") connection while other of Service Client 115 may connect to Host Station 200 wirelessly. Prior to starting these devices, the Site Technician may, as necessary or desired, connect these items to an external power source, such as electrical power lines; in embodiments, various of these computer devices, such as, for example, Host Station 200, Service Client 115, etc., may obtain power from one or more batteries.

Together, Host Station 200, Host Station Datastore 300, Service Client 115, LAN Router 160 may comprise Host Platform 112. As discussed further herein, optionally, Host Platform 112 may further comprise Administrator Computer 105, REST Server and Datastore 170 such as Authentication Server and Datastore 170A, Hardware Encoder 175, and or Streaming Server 125, which computers and processes may be physically within a housing of Host Platform 112 or may be remote.

Figure 2:
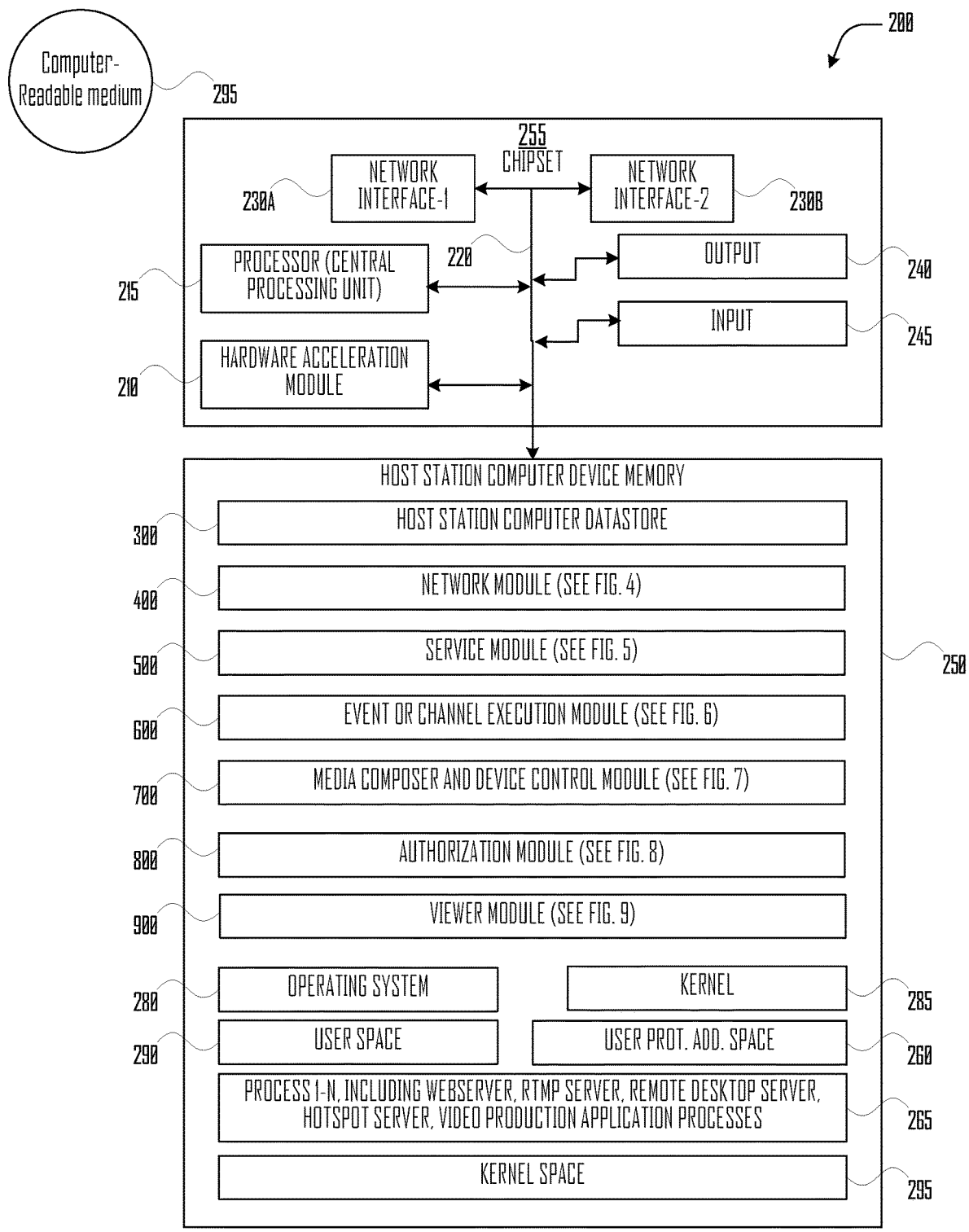
FIG. 2 is a functional block diagram illustrating an example of the Host Station of FIG. 1, incorporated with teachings of the present disclosure, according to some embodiments.

As illustrated further in FIG. 2, Host Station 200 may comprise two network interfaces, Network Interface-1 230A and Network Interface-2 230B. One or both of the network interfaces may be provided external to a housing of Host Station 200, such as by LAN Router 160. When started by Site Technician in Venue 111, Network Module 400 of Host Station 200 may use Network Interface-1 to automatically create a Local Area Network, which Local Area Network may be wireless (a "wireless LAN"), e.g. LAN-1 155A, configured in pass-through mode. As illustrated in the example in FIG. 1, Network Interface-1 may be within LAN Router 160 and LAN Router 160 may provide LAN-1 155A. Network Module 400 of Host Station 200 may connect LAN-1 155A to an external network, such as WAN 150, which external network may be, for example, the Internet.

Network Module 400 of Host Station 200 may use Network Interface-2 and, for example, a HotSpot Service Module within Host Station 200 to automatically create a second wireless LAN, e.g. LAN-2 155B, and to use LAN-2 155B to join LAN-1 155A and to provide Dynamic Host Configuration Protocol ("DHCP") services and Internet Protocol ("IP") address serves to devices on or which connect to LAN-1 155A. Connection to LAN-1 155A may require, for example, a wireline connection, such as RJ45 Cat-6. Ethernet connection, or a wireless connection utilizing (if required) a Service Set Identifier ("SSID") and a password or the like.

In this way, Host Station 200 may provide a wireless LAN, LAN-1 155A, allow applications, services, and host services executed by Host Station 200 to be discovered by members of LAN-1 155A, and to allow applications executed by Host Station 200 to also obtain and provide IP addresses and DNS to clients or users of such applications, services, and host services, including clients or users which may be local to LAN-1 155A and/or which may be in a remote network, such as Wide Area Network 150, which may be the Internet.

Applications executed by Host Station 200 may comprise, for example, Network Module 400, Service Module 500, Event or Channel Execution Module 600, Media Composer and Device Control Module 700, Authorization Module 800, and Process 1-N 265. Process 1-N 265 may comprise, for example, a Webserver, a Real-Time Messaging Protocol server ("RTMP Server"), Remote Desktop Server, Hotspot Server, a Video Production Application (e.g. OBS Studio™) and the like. The Webserver may communicate with web browsers or other client applications using HTTP and Web-socket communication protocols and the like. The RTMP Server may be used to stream media between web browsers or other client applications and the RTMP Server. The Remote Desktop Server may be used to login to and control the Host Station 200 from a remote computer, such as Administrator Computer 105, including through use of Bridge Module 1000. The Hotspot Server may be used to create a wireless LAN, such as LAN-2 155B. The Video Production Application may capture real-time media from media capture devices, perform scene composition, encoding, recording, and broadcasting. When using OBS Studio™ as the Video Production Application, a plugin may be used to customize OBS Studio™ for the purposes described herein.

Clients of applications executed by Host Station 200 may include, for example, Service Client 115. As noted above, Service Client 115 may also have been removed from the carrying case and started up by the Site Technician. Service Client 115 may comprise Media Capture and Production Devices. Media Capture and Production Devices may comprise, for example, microphones, still and video cameras, drones, lights, actuators present in a venue, and the like.

Network Module 400 of Host Station 200 may provide DHCP and Domain Name Resolution services ("DNS) to applications, host services, and modules of Host Station 200 and may connect applications, host services, and modules of Host Station 200 with one another and to other computers. Such connection may be made directly by Network Module 400 within Host Station 200 or may be through connection information provided to REST Server and Datastore 170. By way of example, Webserver and RTMP Server of Host Station 200 may be connected with the Video Production Application, Service Module 500, Event or Channel Execution Module 600, and Media Composer and Device Control Module 700. In embodiments in which devices connect to Host Station 200 through a USB connection or similar, the logical connection may be handled by a USB connection handler of an operating system executed by Host Station 200. By way of example, Network Module 400 or another module or acts may configure REST Server and Datastore 170 with connection information of host services, services, applications, and modules, such as with Streaming/Other Server 125. By way of example, Network Module 400 or another module or acts may be used to supply an Event or Channel Name 310 and Event or Channel Credentials 340 and/or other connection information for Streaming Server 125 to REST Server and Datastore 170

In an embodiment, LAN-1 155A discussed above may be provided by a physically separate wireless router, such as LAN Router 160, with which Host Station 200 may have a wireline or wireless connection.

Service Instantiation.

A Producer or Administrator (hereinafter, "Administrator"), who may be at or remote from Venue 111 and who may also be the Site Technician, may use Service Module 500 and Event or Channel Execution Module 600 to obtain Device Media and to produce and stream a Media Stream with respect to an Event in the Venue or may use Service Module 500 and Event or Channel Execution Module 600 to stream Device Media obtained by a Hardware Encoder 175 as a Media Stream over a Channel. Service Module 500 and Event or Channel Execution Module 600 may be controlled remotely, such as by Viewer Module 900 performed by Administrator Computer 105 (also referred to herein as "Administrator Viewer") when Administrator Computer 105 is remote relative to Host Platform 112.

Authentication Server Network may confirm that Event or Channel Name 310 and Event or Channel Credentials 340 are unique, may determine an Event or Channel GUID 330 of a streaming channel, may supply the Event or Channel GUID to a streaming server or streaming service provider, such as Streaming Server 125, with a create Event/Channel instruction, and may obtain connection-specific information regarding the streaming channel from the Streaming Server 125, such as a Uniform Resource Identifier ("URI") at which the Media Stream may be obtained. Streaming Server 125 may provide streaming services over the LAN or an external network, such as the WAN. In embodiments, a Video Production Application or an internal Streaming Server 125 may be used to provide streaming services over LAN-1 155A or Network while an external Streaming Server 125 may provide streaming over WAN 150.

Use of the Authentication Server Network to transfer representational state with respect to a client-server web service (in this instance, producing and providing a Media Stream), may allow the Administrator to use a variety of computers to control production of the Media Stream, may allow Viewers to render the Media Stream at a variety of computers, and may allow management of credentials and connection information with respect to a Media Stream, including delegation of management to a variety of parties according to a wide range of economic models which may be desired with respect to the Media Stream. The Authorization Server Network may be configured such that the Administrator or another party, such as a delegee, including a Sponsor, may create and send invitations to render Media Stream or Channel and or otherwise control interaction with Viewers in relation to the Media Stream.

Service Control.

Network Module 400 may be used to connect Media Capture and Production Devices ("Media Capture-Production Devices") in Venue 111 with a Host Service, such as a webserver or Video Production Application of Host Station 200 and the webserver and Video Production Application with other Host Services, such as Service Module 500 and Event or Channel Execution Module 600. Media Capture-Production Devices may comprise, for example, microphones, still and video cameras, drones, lights, actuators present in a venue, and the like. When connected to the webserver and, thereby, to Service Module 500 and Event or Channel Execution Module 600, media streams ("Device Media") and control signals to and from the Media Capture-Production Devices may be rendered in and conveyed between the Event or Channel Execution Module 600 and the Media Capture-Production Devices, allowing the Administrator to select Device Media from the Media Capture-Production Devices and/or Transitions (effects generated with respect to Device Media) to be streamed as the Media Stream and allowing the Administrator to control the Media Capture-Production Devices (such as to pan a camera mount, activate an actuator, change light settings, etc.).

Event or Channel Execution Module 600 may be a module of Host Station 200 or may be a component of a client application module, in memory in Host Station 200 or in memory in a separate computer, such as Administrator Computer 105, wherein the client application module is opened in administrator mode (or otherwise with sufficient privileges).

Viewing Media Stream.

Viewers may use a Decoder Computer, such as Decoder Computer 110, to execute Viewer Module 900. When provided with an Event or Channel Name and Viewer Credentials, if required, Viewer Module 900 may allow Viewers to contact to Authentication Server Network to confirm the Event or Channel Name and Viewer Credentials, to receive connection information such as a URI, and to then connect to the Streaming Server 125 to request and receive the Media Stream, and to render the Media Stream. Viewer Module 900 may also allow the Viewer to record the Media Stream locally to Viewer Module 900 in resolution-1, which may be a relatively low resolution. Viewer Module 900 may also allow the Viewer to send a request to Event or Channel Execution Module 600 for access to a High Resolution Recording 395, in resolution-2, which may be a relatively high resolution. The High Resolution Recording 395 or a link thereto may be provided to Authentication Server Network or another datastore or service, or access to the High Resolution Recording 395 or link thereto may be controlled by the Authentication Server Network, such that the Viewer or another party (who may be required to present an identifier and credentials, pay consideration, etc.) may access or render High Resolution Recording 395.

Figure 3:
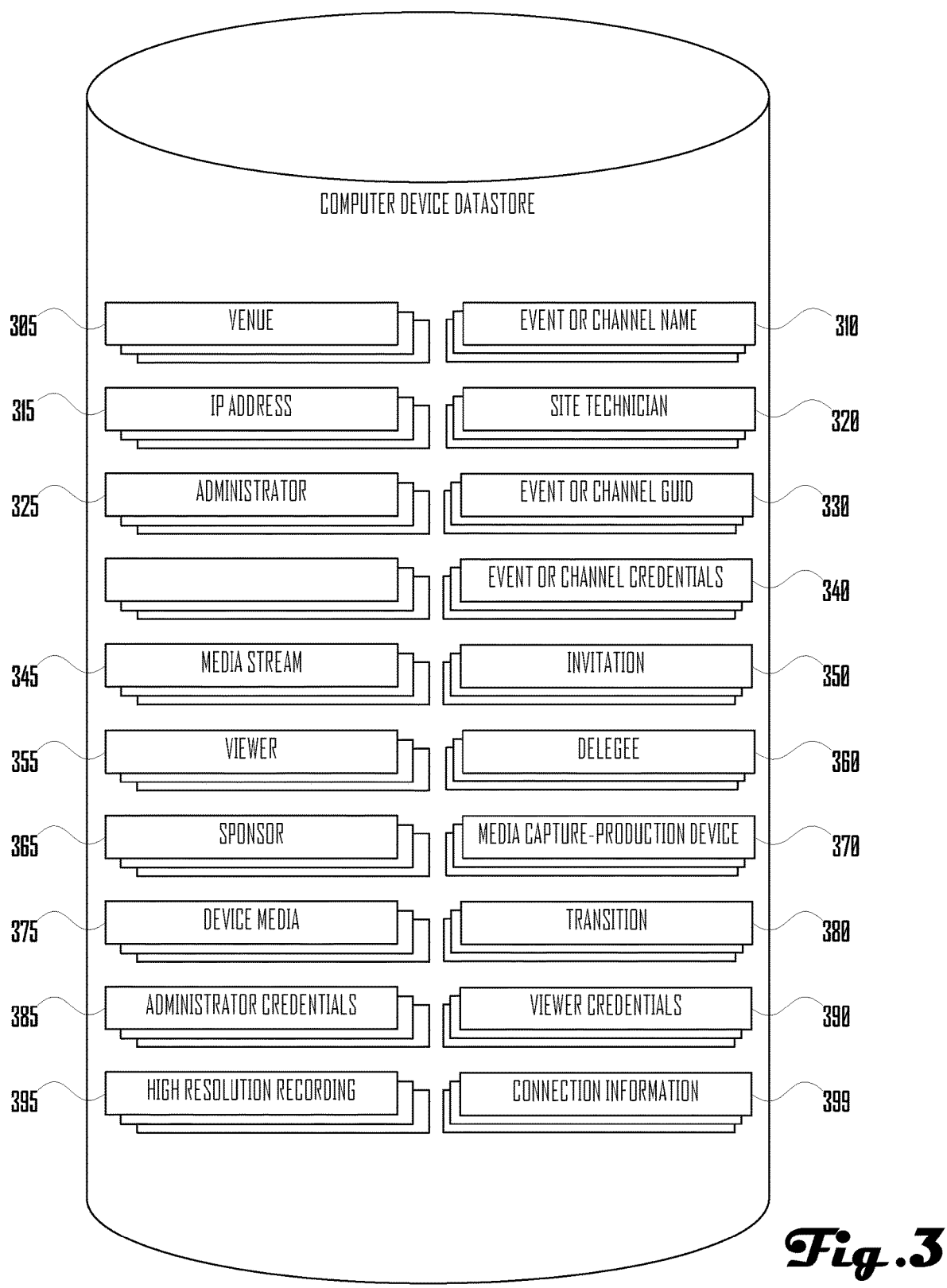
FIG. 3 is a functional block diagram illustrating an example of Host Station Datastore incorporated with teachings of the present disclosure, consistent with embodiments of the present disclosure.

Host Station 200, Host Station Datastore 300, Authentication Server and Datastore 170, Transparent Bridge Computer 120, and or Reservation System 130 may be provided by a computer system described further in relation to FIG. 2 and FIG. 3. Such computer system may comprise, for example, a Celeron™ Core i7, 500 GB of SSD, 8 to 15 GB of RAM, four USB 3.0 ports, two USB 2.0 ports, 1 USB 3.0 Type C/Thunderbolt port, at least one network interface comprising Ethernet, a build-in Wi-Fi antenna, and I/O configured to produce HDMI output. Such computer system may execute an operating system capable of operating as a server, such as Windows 10 Pro or Server and/or OEM, Unix, Linux, macOS Server, or the like.

Host Station 200 is illustrated as connecting to Host Station Datastore 300. Host Station Datastore 300 is described further herein, though, generally, should be understood as a datastore used by Host Station 200.

WAN 150 may comprise computers, network connections among the computers, and software routines to enable communication between the computers over the network connections. Examples of WAN 150 comprise an Ethernet network, the Internet, and/or a wireless network, such as a GSM, TDMA, CDMA, EDGE, HSPA, LTE or other network provided by a wireless service provider. Connection to WAN 150 may be via a Wi-Fi connection. More than one network may be involved in a communication session between the illustrated devices. Connection to WAN 150 may require that the computers execute software routines which enable, for example, the seven layers of the 051 model of computer networking or equivalent in a wireless phone network.

Referring to FIG. 2, FIG. 2 is a functional block diagram illustrating an example of Host Station Computer 200, incorporated with teachings of the present disclosure, according to some embodiments. Host Station 200 may include Chipset 255. Chipset 255 may include Processor 215, input/output (I/O) port(s) and peripheral devices, such as Output 240 and Input 245, Network Interface-1 230A and a second Network Interface-2 230B (which may be provided by a component in a physically external housing, such as LAN Router 160), and Host Station Device Memory 250, all interconnected via Bus 220. Network interface 230-1 and/or Network Interface-2 230B may be utilized to form Wi-Fi networks, such as LAN-1 155A and LAN-2 155B, connections with WAN 150, with Host Station Datastore 300, or to form device-to-device connections with other computers.

Chipset 255 may include communication components and/or paths, e.g., Buses 220, that couple Processor 215 to peripheral devices, such as, for example, Output 240 and Input 245, which may be connected via I/O ports. Processor 215 may include one or more execution cores (CPUs). For example, Chipset 255 may also include a peripheral controller hub (PCH) (not shown). In another example, Chipset 255 may also include a sensors hub (not shown). Input 245 and Output 240 may include, for example, user interface device(s) including a display, a touch-screen display, printer, keypad, keyboard, etc., sensor(s) including accelerometer, global positioning system (GPS), gyroscope, etc., communication logic, wired and/or wireless, storage device(s) including hard disk drives, solid-state drives, removable storage media, etc. I/O ports for Input 245 and Output 240 may be configured to transmit and/or receive commands and/or data according to one or more communications protocols. For example, one or more of the I/O ports may comply and/or be compatible with a universal serial bus (USB) protocol, peripheral component interconnect (PCI) protocol (e.g., PCI express (PCIe)), or the like.

Hardware Acceleration Module 210 may provide hardware acceleration of various functions otherwise performed by other of the modules and processes, such as, for example, Video Production Application, Hotspot Module, Network Module 400, Service Module 500, Event or Channel Execution Module 600, Media Composer and Device Control Module 700, Authorization Module 800, and Viewer Module 900. Hardware acceleration module may be provided by, for example, Integrated Performance Primitives software library by Intel Corporation or similar, as may be executed by an Intel (or other similar) chip, and which may implement, for example, a library of programming functions involved with real time processing. In embodiments, Hardware Acceleration Module 210 may be a programmed FPGA, i.e., a FPGA in which gate arrays are configured with a bit stream to embody the logic of the hardware accelerated function (equivalent to the logic provided by the executable instructions of a software embodiment of the function). In embodiments, Hardware Acceleration Module 210 may also or alternatively include components of or supporting Host Station Device Memory 250.

Host Station Device Memory 250 may generally comprise a random access memory ("RAM"), a read only memory ("ROM"), and a permanent mass storage device, such as a disk drive or SDRAM (synchronous dynamic random-access memory). Host Station Device Memory 250 may store program code for modules and/or software routines, such as, for example, Hardware Acceleration Module 210, Host Station Datastore 300 (illustrated and discussed further in relation to FIG. 3), Network Module 400 (illustrated and discussed further in relation to FIG. 4), Service Module 500 (illustrated and discussed further in relation to FIG. 5), Event or Channel Execution Module 600 (illustrated and discussed further in relation to FIG. 6), Media Composer and Device Control Module 700 (illustrated and discussed further in relation to FIG. 7), Authorization Module 800 (illustrated and discussed further in relation to FIG. 8), and Viewer Module 900 (illustrated and discussed further in relation to FIG. 9), as well as Processes 1-$n$ 265, which may comprise, for example, a Webserver, RTMP Server, Remote Desktop Server, Hotspot Server, Video Production Application processes, kernel and operating system processes, and the like.

Host Station Device Memory 250 may also store Operating System 280. These software components and modules may be loaded from a non-transient Computer Readable Storage Medium 295 into Host Station Device Memory 250 using a drive mechanism associated with a non-transient Computer Readable Storage Medium 295, such as a floppy disc, tape, DVD/CD-ROM drive, memory card, or other like storage medium. In some embodiments, software components may also or instead be loaded via a mechanism other than a drive mechanism and Computer Readable Storage Medium 295 (e.g., via a Network Interface 230).

Host Station Device Memory 250 is also illustrated as comprising Kernel 285, Kernel Space 296, User Space 290, User Protected Address Space 260, and Host Station Datastore 300 (illustrated and discussed further in relation to FIG. 3).

Host Station Device Memory 250 may store one or more Process 265 (i.e., executing software application(s)). Process 265 may be stored in User Space 290. Process 265 may include one or more other process 265a . . . 265n. One or more process 265 may execute generally in parallel, i.e., as a plurality of processes and/or a plurality of threads. As noted, Process 265 may comprise processes for Webserver, RTMP Server, Remote Desktop Server, Hotspot Server, Video Production Application processes or modules.

Host Station Device Memory 250 is further illustrated as storing Operating System 280 and/or Kernel 285. The Operating System 280 and/or Kernel 285 may be stored in Kernel Space 296. In some embodiments, Operating System 280 may include Kernel 285. Operating System 280 and/or Kernel 285 may attempt to protect Kernel Space 296 and prevent access by certain of Process 265a . . . 265n.

Kernel 285 may be configured to provide an interface between user processes and circuitry associated with Host Station 200. In other words, Kernel 285 may be configured to manage access to Processor 215, Chipset 255, I/O ports and peripheral devices by process 265. Kernel 285 may include one or more drivers configured to manage and/or communicate with elements of Host Station 200 (i.e., Processor 215, Chipset 255, I/O ports and peripheral devices).

Host Station 200 may also comprise or communicate via Bus 220 and/or Network Interface 230 with Host Station Datastore 300, illustrated and discussed further in relation to FIG. 3. In various embodiments, Bus 220 may comprise a high speed serial bus, and Network Interface-1 230A and Network Interface-2 230B may be coupled to a storage area network ("SAN"), a high speed wired or wireless network, and/or via other suitable communication technology. Host Station 200 may, in some embodiments, include many more components than as illustrated. However, it is not necessary that all components be shown in order to disclose an illustrative embodiment.

Other computers discussed herein, such as Authentication Server and Datastore 170B, Administrator Computer 105, Streaming Server 125, Sponsor Computer 135, Transparent Bridge Computer 120, Decoder Computer 110, Hardware Encoder 175, and Reservation System 130 may have a structure similar to Host Station 200, though potentially with the same or different modules in such computer device memory. For example, Decoder Computer 110 may comprise Viewer Module 900; Streaming Server 125, if separate from Host Station 200, may comprise a webserver module; Authentication Server and Datastore 170B may comprise Authorization Module 800; Transparent Bridge Computer 120 may comprise Bridge Module 1000; and Hardware Encoder 175 may comprise Hardware Encoder Module 1100.

FIG. 3 is a functional block diagram of the Host Station Datastore 300 illustrated in the computer device of FIG. 2, according to some embodiments. The components of Host Station Datastore 300 may include data groups used by modules and/or routines, e.g, Venue 305, Event or Channel Name 310, IP Address 315, Site Technician 320, Administrator 325, Event or Channel GUID 330, Event or Channel Credentials 340, Media Stream 345, Invitation 350, Viewer 355, Delegee 360, Sponsor 365, Media Capture and Production Device 370, Device Media 375, Transition 380, Administrator Credentials 385, Viewer Credentials 390, High Resolution Recording 395, and Connection Information 399 (as discussed herein in relation to the Modules). The data groups used by modules or routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, references to other database entries, joins, conditional logic, tests, and similar. The components of Host Station Datastore 300 are discussed further herein in the discussion of other of the Figures. The data groups used by modules or routines illustrated in FIG. 3 may be representative of similar data groups in or accessed by computers other than Host Station 200, such as by Decoder Computer 110, Authentication Server and Datastore 170, Transparent Bridge Computer 120, and Hardware Encoder 175.

Figure 4:
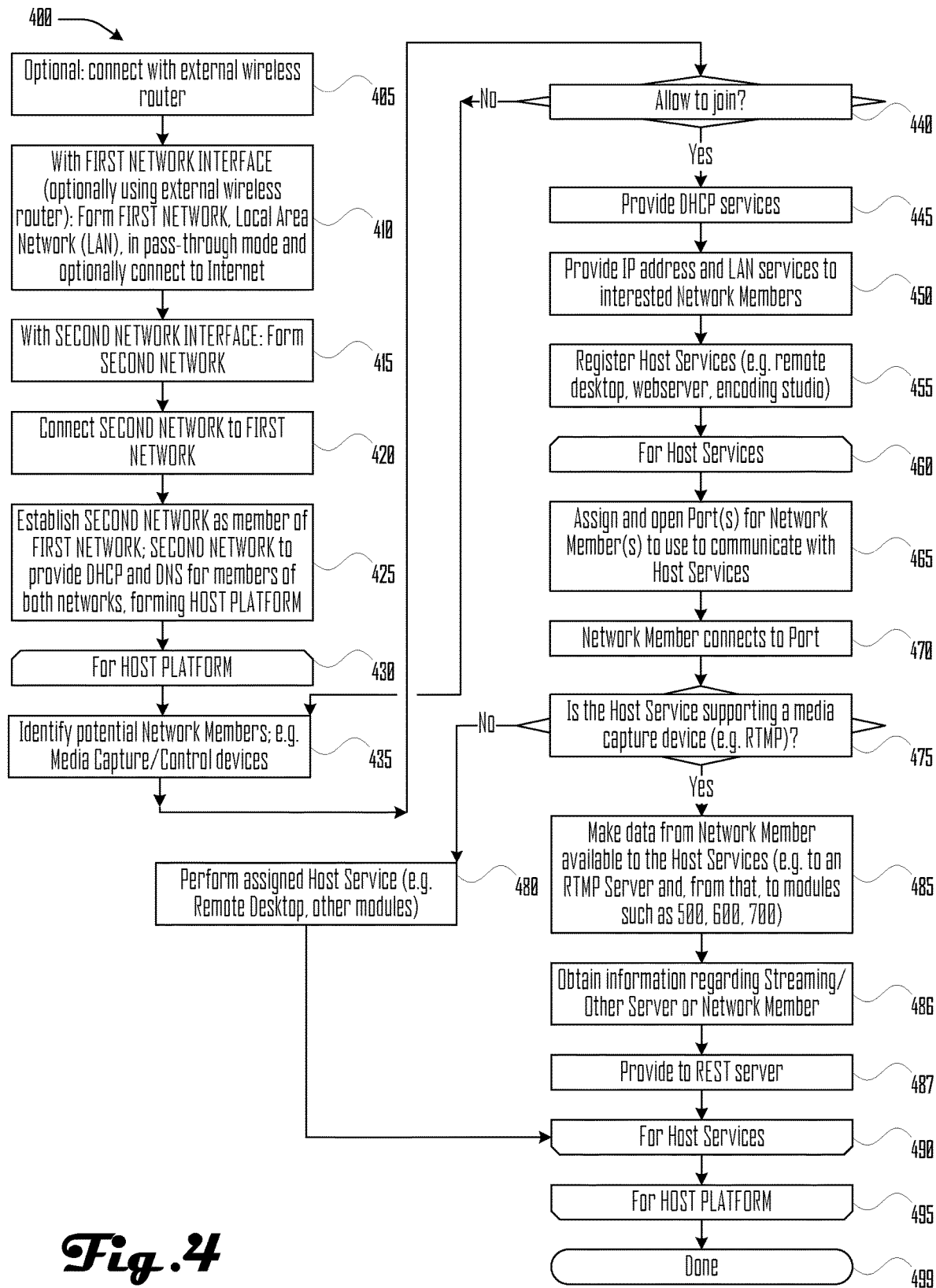
FIG. 4 is a flow diagram illustrating an example of a method performed by a Network Module, according to some embodiments.

FIG. 4 is a flow diagram illustrating an example of a method performed by Network Module 400, according to some embodiments. Network Module 400 may be performed or executed by, for example, Host Station 200, or a similarly configured computer.

At block 405, Network Module 400 may optionally connect with an external wireline or wireless router. In the example illustrated in FIG. 1, such external router may be, for example, LAN Router 160.

At block 410, Network Module 400 may, with a first network interface, such as Network Interface-1 230A, and optionally using, for example, the external router of block 405, may form a first local area network ("LAN") in pass-through mode. Network Module 400 may also optionally connect the first LAN to an external network, such as the Internet. In the example illustrated in FIG. 1, the first LAN may be LAN-1 155A and the external network may be Wide Area Network 150. The first LAN may be a wireless LAN.

At block 415, Network Module 400 may, with a second network interface, such as Network Interface-2 230B, and using, for example, a Host Service or process such as a Hotspot Server, form a second LAN. In the example illustrated in FIG. 1, the second LAN may be LAN-2 155B. The second LAN may be a wireless LAN.

At block 420, Network Module 400 may connect the second LAN to the first LAN.

At block 425, Network Module 400 may establish the second LAN as a member of the first LAN and may configure the first and second LAN such that one of the two LANs, such as the second LAN, provide dynamic host control protocol ("DHCP") services and domain name services ("DNS") for members of the other LAN, such as the first LAN. As discussed herein, in legacy systems, when a network host forms a network, the network host and processes executed on a computer of the network host are not normally discoverable as targets on the network. To allow the network host and its processes to be discoverable as a network target, and to allow the network host to manage names and IP addresses of its own processes and of computers and processes which connect to the network, such as the service clients, Network Module 400 creates a network comprising the above described two LANs. The first LAN is created in pass-through mode; i.e. without providing domain name addressing services and dynamic host control protocol services to members of the first LAN. The network module may connect the first LAN with an external network, such as the Internet. Network Module 400 then creates a second LAN with a second network interface and connects the second LAN to the first LAN; Network Module 400 then causes the second network interface and second LAN to provide domain name addressing services and dynamic host control protocol services to members of the first LAN, including the network host and service clients.

In this way, Network Module 400 of the host platform, e.g. Host Station 200, can allow Service Module 500 of Host Station 200 to be discoverable on the first LAN and can control connection of the service clients, such as Service Client 115, to Service Module 500 through the domain name addressing services and dynamic host control protocol services provided by the second network interface. In this way, the host platform, Host Station 200, and its modules may obtain data from, interact with, and/or control a wide range of service clients, without the service clients having to execute customized software. In this way, the host platform, Host Station 200, does not "lock" a user into using specific service clients but allows a great deal of flexibility.

In opening loop block 430 to closing loop block 495, Network Module 400 may iterate over the Host Platform formed in blocks 405 to 425.

At block 435, Network Module 400 may identify potential members of the first LAN (potential "Network Members"). Such potential Network Members may comprise, for example, media capture devices and media production devices, such as microphones, still and video cameras, drones, lights, and actuators. In the example illustrated in FIG. 1, such potential members may be, for example, Service Client 115 and/or Hardware Encoder 175. Identification of potential Network Members may be according to contact by such potential Network Members with LAN and presentation of an identifier, such as an identifier in or associated with a Media Capture and Production Device 370 record (which may also be associated with Hardware Encoder 175), presentation of credentials, by request of such potential Network Member, by connection of such potential Network Member to Host Station 200 via USB, by input from an operator or administrator of Host Station 200 or Network Module 400 or the like.

At decision block 440, Network Module 400 may determine whether to allow the potential Network Members to join the LAN and the Host Platform. The decision may be based, for example, on whether the potential Network Members, identifiers or credentials or the like are one or more of the following: i) associated with an Event or Channel (including an identifier thereof, such as a name, number, or GUID); ii) valid identifiers or credentials; and or iii) with approval from an Administrator of Host Station 200, Network Module 400, or Service Module 500, or the like.

With a negative (or equivalent) decision block 440, Network Module 400 may return to iterate over a next potential Network Member, if any. If there are no more potential Network Members, Network Module 400 may proceed to block 445.

With an affirmative (or equivalent) decision at decision block 440, at block 445, Network Module 400 may provide DHCP services to the Network Member.

At block 450, Network Module 400 may provide an IP address and LAN services to a Network Member which requires or requests such services.

At block 455, Network Module 400 may register Host Services, e.g. a Remote Desktop Server, a Webserver, a Video Production Application, and other modules such as Service Module 500, Event or Channel Execution Module 600, and or Media Composer and Device Control Module 700, with an operating system of Host Station 200. Such registration may be performed by, for example, installing the Host Service in the operating system of Host Station 200, setting up the operating system to listen for events from the Host Services, and the like.

Opening loop block 460 to closing loop block 490 may iterate over registered Host Services of block 455 and the Network Members allowed to join the network.

At block 465, Network Module 400 may assign and open port(s) for Host Services to use to communicate with Network Members.

At block 470, which may be performed by the Network Member and or may be facilitated by Network Module 400, Network Members may connect to the assigned port(s).

At decision block 475, Network Module 400 may determine whether a Host Service is supporting a Network Member which is a media capture device and which may require an RTMP server or another server which requires data from the Network Member.

If negative or equivalent at decision block 475, at block 480, Network Module 400 may perform an assigned Host Service. For example, Network Module 400 may initiate execution of or perform Host Services or modules such as remote desktop server, other modules, and the like.

If affirmative or equivalent at decision block 475, at block 485, Network Module 400 may make data from the Network Member available to the Host Service, such as to an RTMP server which may be a part of a Host Service module.

At block 486, Network Module 400 may obtain information regarding the Streaming Service, such as Streaming/Other Server 125 and/or regarding a Host Service and/or a Network Member, when such information would be beneficial to be known or accessible to other modules. For example, information obtained from or in relation to Streaming Server 125 may comprise an identifier (name, number, etc.), a capacity, an availability, an address thereof, a server endpoint thereof, or the like. Other modules and/or computers may need to have this information to interact with Streaming Server 125.

At block 487, Network Module 400 may provide some or all of the information obtained at block 486 to the Authentication Server Network, so that other computers and/or modules may be able to obtain such information, for example, from Authentication Server Network.

In this way, Network Module 400 of Host Platform 112 can allow Service Module 500 to be discoverable on the first LAN and can control connection of service clients and other modules to Service Module 500 through the domain name addressing services and dynamic host control protocol services provided by Network Module 400 through the second network interface. In this way, Host Platform 112 and its services modules may obtain data from, interact with, and/or control a wide range of service clients, without the service clients having to execute customized software. In this way, the host platform does not "lock" a user into using specific service clients but allows a great deal of flexibility.

At closing loop block 490, Network Module 400 may return to opening loop block 460 to iterate over other Host Services.

At closing loop block 495, Network Module 400 may return to opening loop block 430 to iterate over a then-current Host Platform.

Upon occurrence of an interrupt condition, at done block 499, Network Module 400 may conclude or return to another module or process which may have called it.

Figure 5:
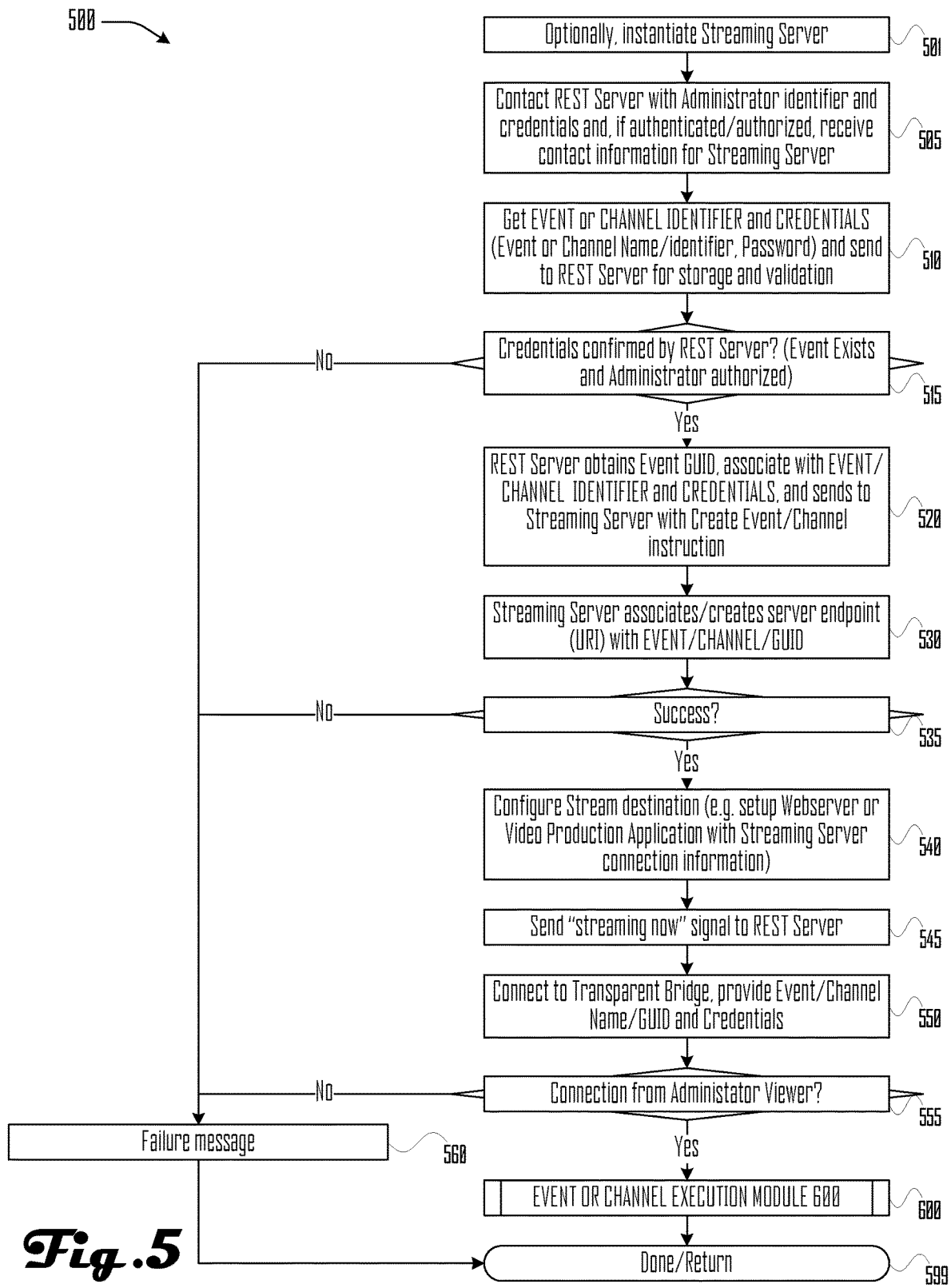
FIG. 5 is a flow diagram illustrating an example of a method performed by a Service Module, according to some embodiments.

FIG. 5 is a flow diagram illustrating an example of a method performed by Service Module 500, according to some embodiments. Service Module 500 may be performed or executed by, for example, Host Station 200, or a similarly configured computer.

At block 501, Service Module 500 may optionally initiate or instantiate a streaming server, configured to stream media over a data network such as the Internet, broadcast television, or the like. If not already performed, Network Module 400 may perform, for example, blocks 486 and 487 with respect to such streaming server, such that other modules and/or computers may obtain information regarding the streaming server. Streaming Server 125 may be registered with a Host Service of Host Station 200, such as with a Video Production Studio and or Webserver. The Host Service may be configured to stream a stream of media, such as video, to the streaming server, which media may be transcoded or otherwise processed by the streaming server before being streamed, by the streaming server, to users and or a content distribution system.

In embodiments, the streaming server may be initiated on the network or LAN created by Network Module 400, for example, as a Host Service, provided by a streaming server module installed in or executed by Host Station 200. In embodiments, the streaming server may be initiated or instantiated in a remote streaming server on the Internet. The streaming server may be provided by the operator of Host Platform 112 or by a third party. In the example illustrated in FIG. 1, Streaming Server 125 overlaps with Host Station 200, indicating that it may be a module of or component closely coupled to Host Station 200 or that it may be remote from Host Station 200, including remote from Venue 111. Communication between Host Station 200 (and modules thereof) with Streaming Server 125 may be through Bus 220 within Host Station 200 (such as when Streaming Server 125 is a module within Host Station 200), may be through a network module of Host Station 200 and LAN-1 155A (such as when Streaming Server 125 is a module within a computer physically external to Host Station 200 but within range of LAN-1 155A), or WAN 150 (such as when Streaming Server 125 is a module within a computer physically external to Host Station 200, including a computer managed by a third-party, which is connected to WAN 150).

At block 505, Service Module 500 may receive Site Technician and/or Administrator identifier and credentials and may contact Authentication Server Network to authenticate and authorize such identifier and credentials. Authentication Server Network may be, for example, REST Server and Datastore 170, which may be internal to Host Station 200, such as in Authentication and Server Datastore 170A, or may be external, such as in Authentication and Server Datastore 170B. If authenticated, Authorization Server Network may provide contact information regarding the Streaming Server to Service Module 500.

At block 510, Service Module 500 may obtain an Event or Channel Identifier and Credentials therefor, such as an Event or Channel 310 and Event or Channel Credentials 340, and send some or all of the foregoing to Authentication Server Network for storage and validation. Service Module 500 may perform this block in response to, for example, a join Event or join Channel instruction received from Site Technician and/or Administrator.

At decision block 515, Service Module 500 may determine whether the name and credentials of block 505 and/or 510 are confirmed or validated. Validation by the Authentication Server Network may comprise, for example, determining that the Event or Channel exists, setting up and/or configuring credentials therefore, and determining that the Site Technician and/or Administrator is authenticated and authorized to interact with or otherwise configure the Event or Channel.

If affirmative or equivalent at decision block 515, at block 520 Authentication Server Network may retrieve an Event or Channel GUID, such as an Event or Channel GUID 330 record, may associate such GUID with the identifier and credentials of the Event or Channel, and may send the foregoing to Streaming Server 125 with an instruction to create an Event and/or Channel.

At block 530, Streaming Server 125 may create or associate a server endpoint, such as a URI, with the Event and/or Channel it was instructed to create, and may transmit Streaming Server 125 Event and/or Channel connection information, such server endpoint to, for example, Authentication Server Network for storage or communication to other modules, such as Service Module 500. Connection information maybe stored, for example, in one or more Connection Information 399 records. At block 530, Streaming Server 125 may transmit the server endpoint to, for example, Authentication Server Network and/or directly to Service Module 500.

At block 535, Service Module 500 may determine whether, for example, a Streaming Server 125 server endpoint has successfully been setup for the Event or Channel identifier and credentials of block 510. Such success may be indicated by, for example, receiving the GUID and/or Streaming Server 125 connection information and/or server endpoint for the Event or Channel from, for example, the Authentication Server Network.

At block 540, Service Module 500 may configure a Media Stream destination in Host Services and modules which require such information. For example, Service Module 500 may setup Webserver and/or Video Production Application with the contact information and/or server endpoint of the Streaming Server 125, such that these Host Services and modules may stream Device Media to the Streaming Server 125 and that Streaming Server 125 will then stream a corresponding Media Stream to Administrator.

At block 545, Service Module 500 may send a "streaming now" or similar signal to Authentication Server Network, which signal is to inform Authentication Server Network and modules or computers which obtain information from Authentication Server Network that Service Module 500 has confirmed that the Streaming Server 125 is to receive Device Media and is to transmit a corresponding Media Stream.

At block 550, Service Module 500 may connect to Transparent Bridge 120 and present the Event or Channel Name and/or Event or Channel GUID and credentials.

At decision block 555, Service Module 500 may determine whether it has received a contact by an Administrator Viewer, for example, from Mobile Decoder Computer 110A and Viewer Module 900 when such computer and module is provided with Administrator Credential 385 record.

Block 550 and decision block 555 may be used, for example, when the Administrator is or becomes remote from Venue 111 and/or when the Event or Channel is being setup by the Site Technician, in which case Administrator may form a remote connection with Service Module 500, such as via remote desktop, to continue Service Module 500.

At block 600, Service Module 500 may perform or initiate performance of Event or Channel Execution Module 600.

If negative or equivalent at decision blocks 515, 535, and or 555, at block 560, Service Module 500 may generate a failure message or equivalent.

At done or return block 599, Service Module 500 may conclude and or return to another process which may have called it.

Figure 6:
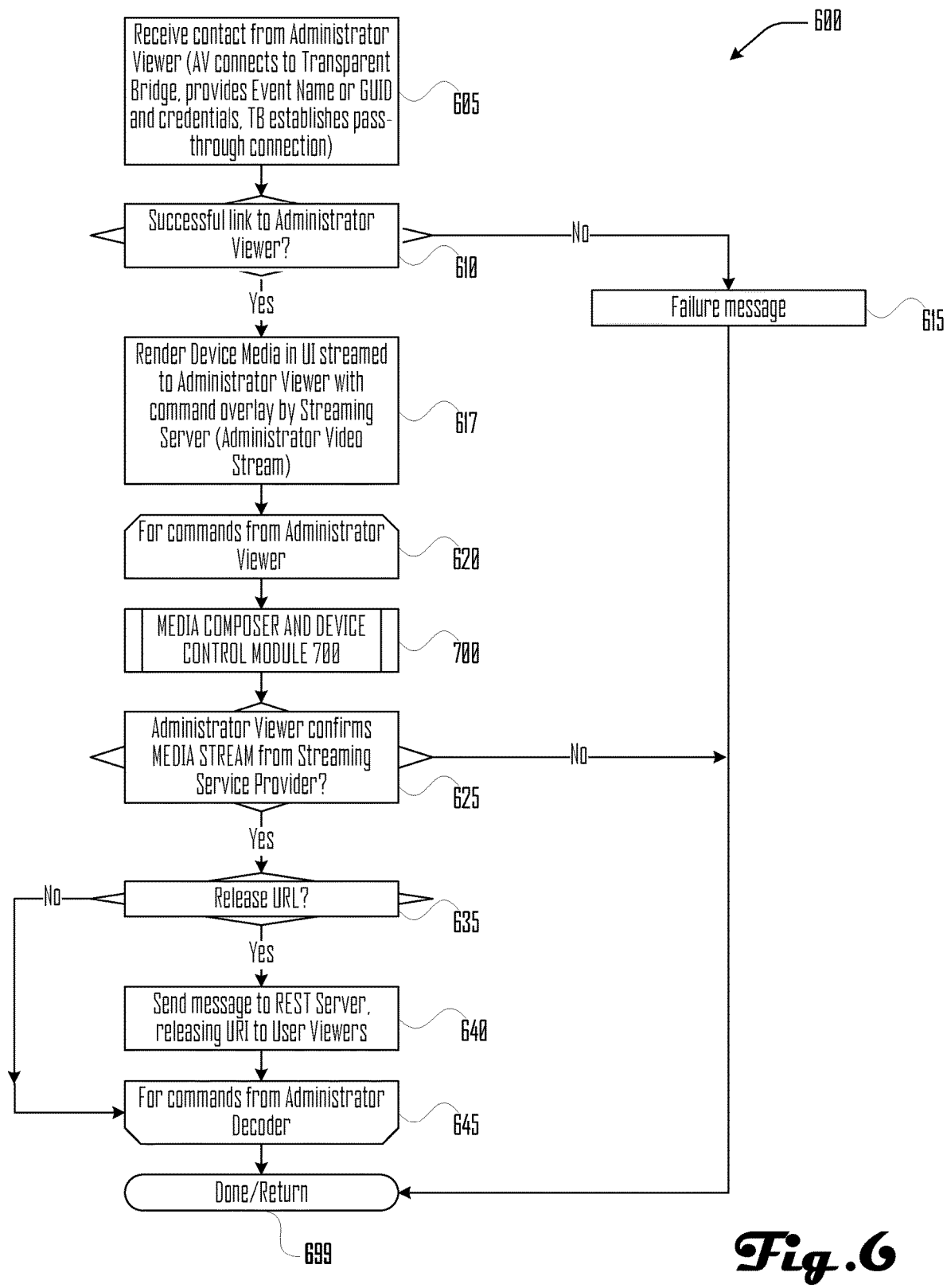
FIG. 6 is a flow diagram illustrating an example of a method performed by an Event or Channel Execution Module, according to some embodiments.

FIG. 6 is a flow diagram illustrating an example of a method performed by Event or Channel Execution Module 600, according to some embodiments. Event or Channel Execution Module 600 may be performed or executed by, for example, Host Station 200, or a similarly configured computer.

At block 605, Event or Channel Execution Module 600 may receive a connection from Administrator Viewer, e.g. in the example in FIG. 1, from Mobile Decoder Computer 110A, which computer maybe operated by an Administrator remote from Venue 111 and/or Host Station 200 and which computer may be performing Viewer Module 900. To form such connection, Administrator Viewer may connect to Transparent Bridge 120 and provide Event or Channel 310 identifier, present Administrator Credentials 385, and establish a pass-through or naked proxy connection to Host Station 200 and Event or Channel Execution Module 600. Please also see, for example, Bridge Module 1000, discussed herein.

At decision block 610, Event or Channel Execution Module 600 may determine whether it has established a successful connection or link with Administrator Viewer, e.g. via Transparent Bridge 120 and Bridge Module 1000.

If affirmative or equivalent at decision block 610, at block 617, Event or Channel Execution Module 600 may obtain available Device Media from Media Capture Devices, insert an overlay of Administrator commands, and transmit a result thereof to Streaming Server 125 to be streamed as an administrator video stream by Streaming Server 125 to a User Interface ("UI") of Administrator Viewer. The UI of Administrator Viewer may comprise several windows. The Several windows may comprise, for example, such administrator video stream of Device Media from Media Capture Devices, as well as a Media Stream transmitted from the server endpoint or URI, which Media Stream is meant to also be received by Viewers (for example, after approval by Administrator, as discussed further herein).

Opening loop block 620 to closing loop block 645 may iterate over commands from Administrator Viewer. If negative or equivalent at decision block 610, at block 615 Event or Channel Execution Module 600 may generate an error or failure message and may proceed to done or return block 699.

At block 700, Event or Channel Execution Module 600 may perform Media Composer and Device Control Module 700. Media Composer and Device Control Module 700 may allow Event or Channel Execution Module 600 and/or Administrator to, for example, compose media to be streamed to Viewers and or to control devices, such as Media Capture and Production Devices in, for example, Venue 111 of an Event or Channel.

At decision block 625, Event or Channel Execution Module 600 may determine whether Administrator Viewer has confirmed receiving an administrator video stream from the Streaming Server 125, such as the administrator video stream of block 617, comprising the Media Stream from the server endpoint. Such confirmation may be automatic with respect to whether the Administrator Viewer is receiving and able to render the administrator video stream and/or Media Stream or it may be setup to allow the Administrator to provide manual input regarding whether such streams is being received and rendered.

If affirmative or equivalent at decision block 625, at block 635 Event or Channel Execution Module 600 may determine whether Administrator and or an automatic process has generated an instruction to release the URI for the Media Stream, such that Viewers who connect to the server endpoint or URI will receive the Media Stream also received by Administrator Viewer. In embodiments, this determination regarding whether to release the URI for the Media Stream may be based on input from Administrator. In embodiments, Event or Channel Execution Module 600 may make this determination automatically, such as based on whether the Media Stream meets technical requirements, such as a bit rate, resolution, screen size or the like; in embodiments, such determination may be made automatically based on machine image or audio processing, as may be performed by hardware acceleration module 210, such as when content may not be streamed to certain parties or in certain channels when it is determined by machine processing to contain content which may not be suitable to certain audiences, such as pornographic or violent images or vulgar speech.

If affirmative or equivalent at decision block 625, Event or Channel Execution Module 600 may send a message to Authentication Server Network, releasing URI to User Viewers. Release of the URI may involve setting a code in Authentication Server Network and or in Streaming Server 125, which code may initiate transmission of the Media Stream to more than Administrator, such as to Viewers.

At closing loop block 645, Event or Channel Execution Module 600 may return to opening loop block 620 to iterate over other commands, if any received from Administrator Viewer.

At done block 699, Event or Channel Execution Module 600 may conclude and or return to another process which may have called it.

Figure 7:
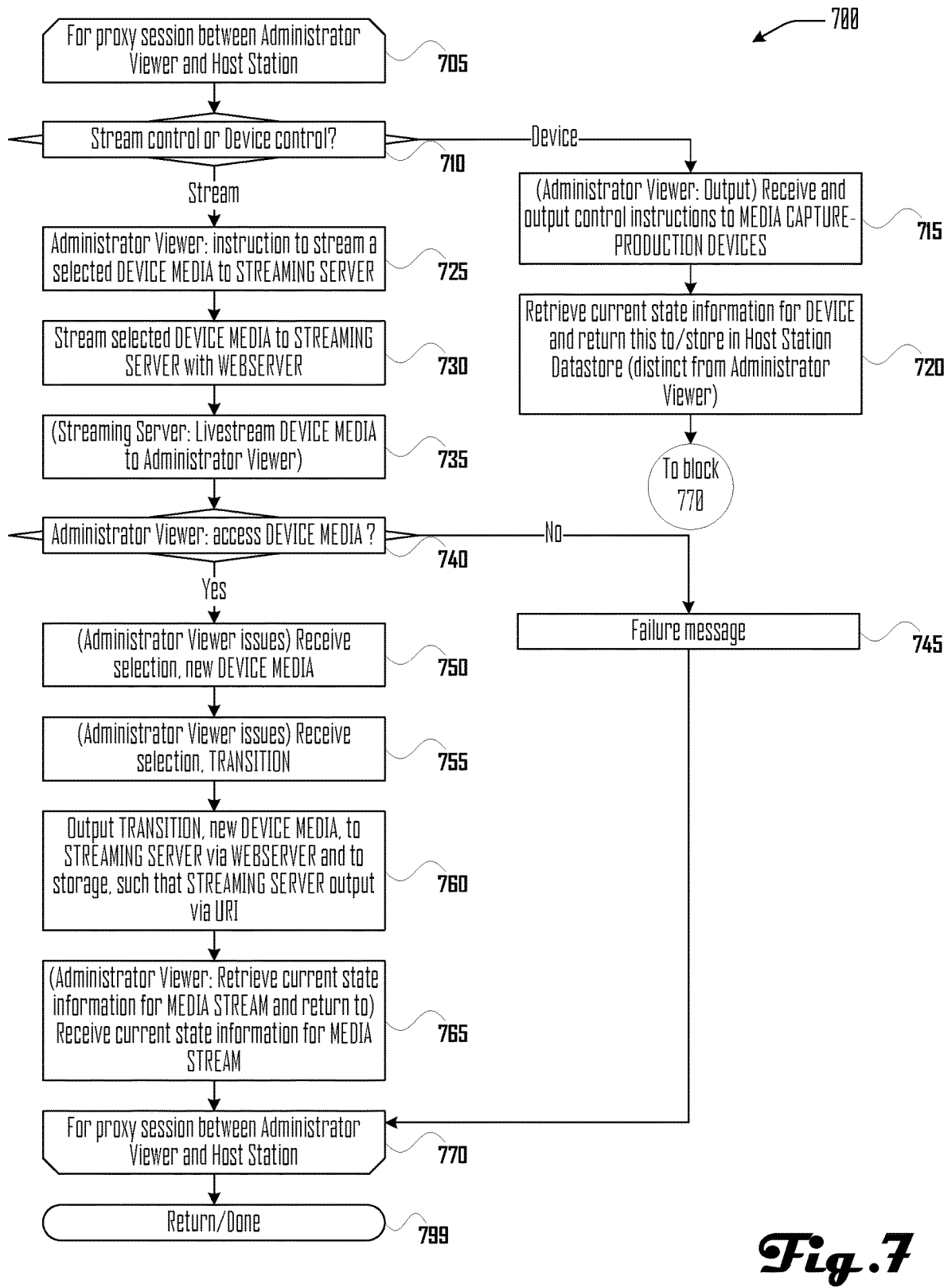
FIG. 7 is a flow diagram illustrating an example of a method performed by a Media Composer and Device Control Module, according to some embodiments.

FIG. 7 is a flow diagram illustrating an example of a method performed by Media Composer and Device Control Module 700, according to some embodiments. Media Composer and Device Control Module 700 may be performed by, for example, Host Station 200.

Opening loop block 705 to closing loop block 770 may iterate over a proxy session between Administrator Viewer and Host Station 200 and commands which may be received from Administrator Viewer during such proxy session which may be directed to Media Composer and Device Control Module 700. The proxy session may be initiated by Event or Channel Execution Module 600 and Bridge Module 1000, as discussed herein.

At decision block 710, Media Composer and Device Control Module 700 may determine whether then-current commands are addressed to control of a Device Media such as a stream from a Media Source or to control of a Media Capture and Production device, such as a Media Source, a still or video camera, a drone, lights, and or another actuator, which Media Capture and Production device may produce a stream.

If "stream" or equivalent at decision block 710, at block 725 Media Composer and Device Control Module 700 may receive an instruction to stream a selected Device Media from a Media Source to Streaming Server 125.

At block 730, Media Composer and Device Control Module 700 may stream the selected Device Media to Streaming Server using, for example, a Host Service such as a Webserver module.

At block 735, Streaming Server may stream an administrator video stream of the Device Media to the Administrator UI.

At decision block 740, Media Composer and Device Control Module 700 may determine whether Administrator Viewer can access the Device Media and render it in the Administrator UI.

If affirmative or equivalent at decision block, at block 750, Media Composer and Device Control Module 700 may receive a selection of Device Media rendered in a window in the Administrator UI. Device Media may be stored in and/or identified by, for example, one or more Device Media 375 records. The selection may be received from, for example, Administrator Viewer. As noted, available Device Media 375 may be rendered in windows of a UI of Administrator Viewer.

At block 755, Media Composer and Device Control Module 700 may receive a selection of a Transition. Transition may be, for example, an effect such as a fade, a cross-cut, or the like, over time. Transitions, modules to implement transitions, or identifiers thereof may be stored in Host Station Datastore 300 as one or more Transition 380 records. The selection may be received from, for example, Administrator Viewer.

At block 760, Media Composer and Device Control Module 700 may output the selected Transition 380 or a result thereof and the selected Device Media 375 to Streaming Server 125 using a Host Service such as the Webserver module; this output may include an instruction to update the Media Stream output from or at the URI with the selected Transition 380 or a result thereof and the selected Device Media 375. In addition, Media Composer and Device Control Module 700 may store the selected Transition 380 or a result thereof and the selected Device Media 375 in high resolution in, for example, Host Station Datastore 300 as one or more High Resolution Recording 395 records.

At block 765, Media Composer and Device Control Module 700 may receive from, for example, Administrator Viewer and/or Streaming Server 125, current state information for Media Stream and Service Client status.

At closing loop block 770, Media Composer and Device Control Module 700 may return to opening loop block 705 to iterate over another proxy session, if any, between Administrator Viewer and commands which may be received from Administrator Viewer during such proxy session.

At block 715, Media Composer and Device Control Module 700 may receive from, for example, Administrator Viewer, and may output control instructions to Media Capture and Production Devices, e.g. Service Client 115 and/or Hardware Encoder 175. Control instructions may comprise, for example, instructions to change or output a view angle, a microphone level, a lighting setting, an actuator setting or action, or the like.

At block 720, Media Composer and Device Control Module 700 may retrieve current state information for Media Capture and Production Devices and may store this as, in, or associated with one or more Media Capture and Production Device 370 records.

At block 745, if negative or equivalent at decision block 740, Media Composer and Device Control Module 700 may issue a failure or error message.

Upon occurrence of an interrupt or conclusion of a proxy session between Administrator Viewer and Host Station, at done or return block 799, Media Composer and Device Control Module 700 may conclude and or return to another process which may have called it.

Figure 8:
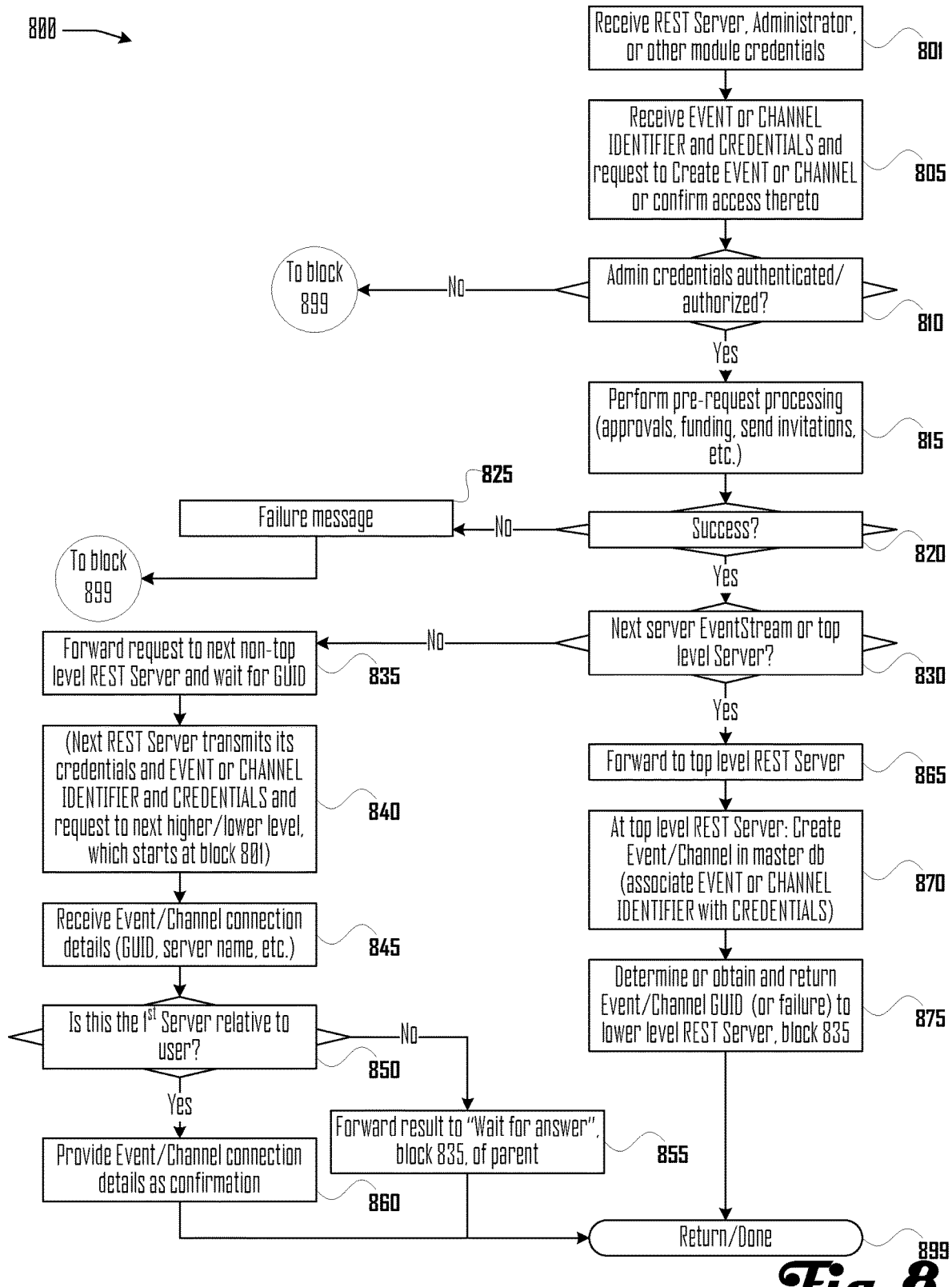
FIG. 8 is a flow diagram illustrating an example of a method performed by an Authorization module, according to some embodiments.

FIG. 8 is a flow diagram illustrating an example of a method performed by Authorization Module 800, according to some embodiments. Authorization Module 800 may be performed by, for example, Host Station 200 and an Authorization Server module within Host Station, such as Authentication Server and Datastore 170Am and or a remote Authorization Server, such as Authentication Server and Datastore 170B. Authorization Servers may be, for example, tiered REST Servers. Tiered REST Servers may respond to application program interface ("API") commands. Tiered REST Servers may be configured to delegate authority to sub-levels.

At block 801, a then-current REST Server in the Authentication Server Network performing Authorization Module 800 may receive credentials of another server in the Authentication Server Network and/or of another module, such as Viewer Module 900, Hardware Encoder Module 1100, or an Administrator.

At block 805, the then-current Authorization Module 800 may receive the Event or Channel identifier, such as Event or Channel Name 310 record, Credentials of or to be associated with the Event or Channel identifier, such as Event or Channel Credentials 340, and a request to confirm such Event or Channel Identifier and Credentials or a request to create an Event or Channel which is to stream a Media Stream corresponding to such Event or Channel Identifier and Credentials.

At decision block 810, the then-current Authorization Module 800 may determine whether the Credentials of block 801 are authorized.

If affirmative or equivalent at decision block 810, at block 815, the then-current Authorization Module 800 may perform pre-request processing which Authorization Module 800 may have been setup to perform with respect to an Event or Channel. Pre-request processing may comprise, for example, approvals, payment confirmation, sending invitations, or the like. If negative or equivalent at decision block 810, the then-current Authorization Module 800 may issue an error or non-confirmation message and may proceed to done or return block 899.

At decision block 820, the then-current Authorization Module 800 may determine whether pre-request processing of block 815 was performed successfully, such as according to responses by other processes, approving computers, payment processors, and the like.

If affirmative or equivalent at decision block 820, at decision block 830, the then-current Authorization Module 800 may determine whether the next REST Server in the Authentication Server Network is the "EventStream" or top level server in the Authorization Server network, such as a top level tier in a tiered REST Server Network.

If negative or equivalent at decision block 830, then at block 835, then then-current Authorization Module 800 may forward the then-current Event or Channel identifier and Credentials and/or response status of block 820 to the next tiered REST Server in the Authentication Server Network and may wait for an answer to the request to create or confirm the Identifier and Credentials of an Event or Channel from a higher-level REST Server in the tiered REST Server Network.

At block 840, the next tiered REST Server may then transmit Credentials and the Event or Channel identifier and Credentials and/or response status of block 820 to a next REST Server, which then next REST Server starts Authorization Module 800. This block is parenthetical, because it is not performed by the then-current Authorization Module, but by another REST Server which received the forwarded information of block 835.

At block 845, the then-current Authorization Module 800 may receive Event or Channel connection details, such as an Event or Channel GUID, a name and address of the Streaming Server 125, a server endpoint or URI, and the like.

At decision block 850, the then-current Authorization Module 800 may determine if it is the first REST Server relative to the user who submitted the request of block 805 on a first iteration of Authorization Module 800.

If affirmative or equivalent at block 850, at block 860 Authorization Module 800 may provide the connection details, such as the GUID, such as the Event or Channel GUID 330, server name, connection information of such server, etc., which may have been provided by a higher level REST Server in the Authentication Server network during an earlier iteration of Authorization Module 800 by the higher level REST Server in the Authentication Server network.

If negative or equivalent at decision block 850, at block 855, Authorization Module 800 may forward the result of block 850 to "Wait for answer" block 840 of a parent REST Server in the Authentication Server network.

If affirmative or equivalent at decision block 830, at block 865, the then-current Authorization Module 800 may forward the Event or Channel identifier, Credentials, the status of pre-request processing, and the request to the top level REST Server in the Authentication Server Network.

At block 870, Authorization Module 800 at a top level REST Server in the Authentication Server Network may create an Event or Channel Name 310 record corresponding to the Event or Channel identifier of block 805, create Event or Channel Credential 340 record corresponding to the Credentials of block 805, and associate the Event or Channel Name 310 record with the Event or Channel Credential 340 record.

At block 875, Authorization Module 800 at the top level REST Server in the Authentication Server Network may determine an Event or Channel GUID and store the same in an Event or Channel GUID 330 record, and return to a lower-level REST Server or to the party which submitted the request of block 805 on a first iteration of Authorization Module 800, the Event or Channel GUID 330 and connection details regarding the Streaming Server 125 as a confirmation. In embodiments, the top level REST Server in the Authentication Server Network may obtain the Event or Channel GUID from Streaming Server 125.

At done or return block 899, Authorization Module 800 may conclude and or return to a process which called it.

Figure 9:
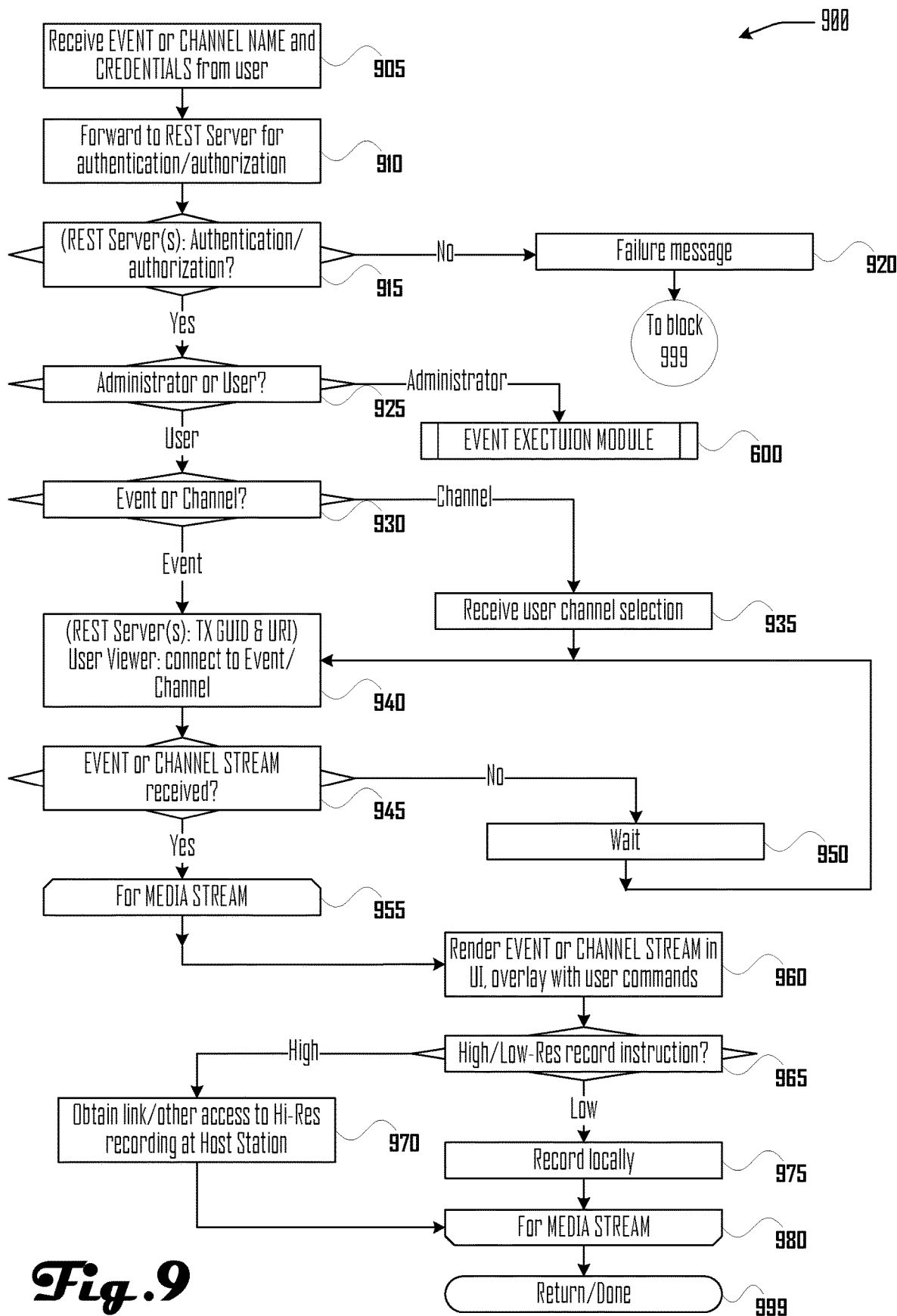
FIG. 9 is a flow diagram illustrating an example of a method performed by a Viewer Module, according to some embodiments.

FIG. 9 is a flow diagram illustrating an example of a method performed by Viewer Module 900, according to some embodiments. Viewer Module 900 may be performed by, for example, Administrator Computer 105, Stationary Decoder Computer 110B, Mobile Decoder Computer 110A. Such computers may be similar to Host Station 200, illustrated and described in relation to FIG. 2 and FIG. 3, though may comprise one network interface, rather than two.

At block 905, Viewer Module 900 may receive an Event or Channel identifier, such as or similar to an Event or Channel Name 310, and Credentials, such as or similar to Event or Channel Credential 340 record. The Event or Channel identifier and Credentials may be received from input provided by, for example, a user. The Event or Channel identifier may be meant to correspond to one or more Event or Channel 310 record; the Credentials may be meant to correspond to an Event or Channel Credential 340 record. The Identifier and Credentials may be used to allow a Viewer, whether an Administrator Viewer or a User, to access, stream, and or decode Streaming Media prepared through use of Service Module 500, Event or Channel Execution Module 600, and or Media Composer and Device Control Module 700.

At block 910, Viewer Module 900 may forward the identifier and credentials to a REST Server in the Authentication Server Network for confirmation.

At decision block 915, a REST Server in the Authentication Server Network may or may not return authentication and authorization relative to the information of block 910.

If negative or equivalent at decision block 915, at block 920, Viewer Module 900 may issue a failure or error message and may proceed to block 999.

If affirmative or equivalent at block 915, at decision block 925 Viewer Module 900 may determine whether the credentials are associated with an Administrator or a User. This determination may be based on, for example, the credentials, a code or other information from the Authentication Server or REST Server network, or the like.

If Administrator or equivalent at block 925, at block 600 Viewer Module 900 may call Event or Channel Execution Module 600.

If User or equivalent at block 925, at decision block 930, Viewer Module 900 may determine whether the identifier is of or associated with an Event or a Channel. This determination may be made, for example, by reference to an Event or Channel 310 record or equivalent.

If the identifier is of or associated with a Channel, which may include more than one channel or sub-channel, at block 935 Viewer Module 900 receive a user channel or sub-channel selection, within, for example, a range of channels represented by a Channel identifier.

If the credentials are associated with an Event or after receiving the user channel or sub-channel selection, at block 940 an Authorization Module 900 of a REST Server in the Authorization Server Network may transmit an Event or Channel GUID 330 and/or connection details regarding how to connect to the corresponding Media Stream, Viewer Module 900 may receive the Event or Channel GUID 330 and/or connection details, and Viewer Module 900 may use such information to connect to a Media Stream at the Streaming Server 125; the Media Stream at the Streaming Server 125 may correspond to a Media Stream 345 record.

At decision block 945, Viewer Module 900 may determine whether the Media Stream is received by Decoder Computer 110 and Viewer Module 900.

If negative or equivalent at decision block 945, at block 950 Viewer Module 900 may wait for a period before returning to decision block 945 or before producing an error or interrupt message or condition and proceeding to done or return block 999.

If positive or equivalent at decision block 945, opening loop block 955 to closing loop block 980 may iterate over a then-current Media Stream being received.

At block 960, Viewer Module 900 may overlay user commands on the Media Stream and render a result thereof in a user interface of Decoder Computer 110.

At decision block 965, Viewer Module 900 may determine whether it has received a record instruction from, for example, a user of Decoder Computer 110 or another party and whether the record instruction is to record in high or low resolution.

If a record in low resolution or equivalent instruction is determined to have been received at decision block 965, at block 975 Viewer Module 900 may record the Event or Channel Stream locally in a datastore of Decoder Computer 110.

If a record in high resolution or equivalent instruction is determined to have been received at decision block 965, at block 970 Viewer Module 900 may obtain a link or other access (such as credentials) to obtain a high resolution file corresponding to the Event or Channel Stream, wherein such high resolution file may be remote, relative to Decoder Computer 110, in, for example, Host Station Datastore 300. Such high resolution file may, for example, be Device Media sent by the Webserver module to the Streaming Server, to be streamed to Decoder Computer 110. Such Device Media may have been stored as one or more High Resolution Recording 395 records in Host Station Datastore 300.

At closing loop block 980, Viewer Module 900 may return to opening loop block 955 to continue to iterate over a then-current Media Stream.

At done or return block 999, Viewer Module 900 may conclude and/or return to a process which may have called it.

Figure 10:
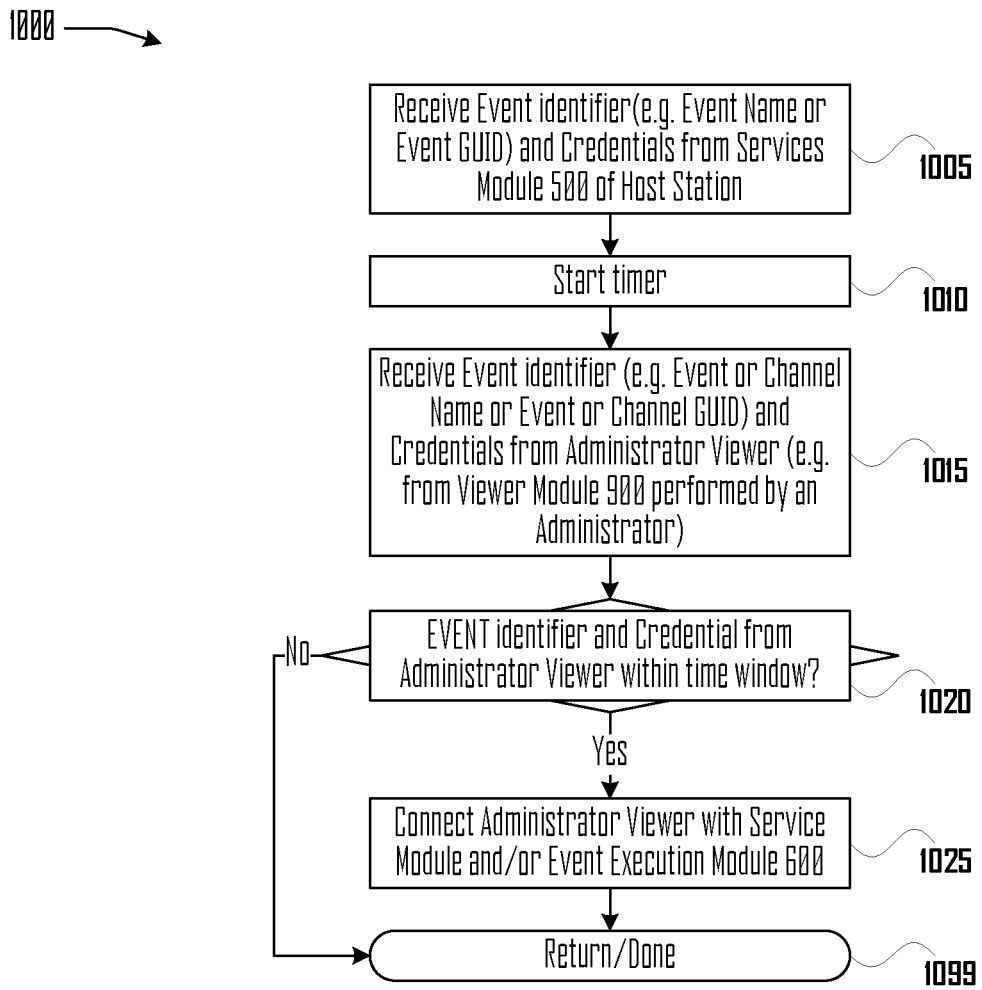
FIG. 10 is a flow diagram illustrating an example of a method performed by a Bridge Module, according to some embodiments.

FIG. 10 is a flow diagram illustrating an example of a method performed by Bridge Module 1000, according to some embodiments. In the example illustrated in FIG. 1, Bridge Module 1000 may be performed by, for example, Bridge 120. Bridge 120 may be similar to Host Station 200, illustrated and described in relation to FIG. 2 and FIG. 3, though may comprise one network interface, rather than two. Bridge 120 may be provided in or by, for example, a virtual computer instance obtained from a third party, such as Amazon Web Servers, Microsoft Azure, or the like, which virtual computer instance may be programmed with Bridge Module 1000.

At block 1005, Bridge Module 1000 may receive an identifier of an Event, such as an Event or Channel Name or Event or Channel GUID, and Credentials from, for example, Service Module 500 of Host Station 200.

At block 1010, Bridge Module 1000 may start a timer, to measure an allowed time window within which Bridge Module 1000 expects to receive connection from Administrator Viewer via Viewer Module 900.

At block 1015, Bridge Module 1000 may receive the identifier of the Event, such as an Event or Channel Name or Event or Channel GUID, and Credentials from, for example, Administrator Viewer via Viewer Module 900.

At decision block 1020, Bridge Module 1000 may determine whether it has received corresponding Event identifier and Credentials from Administrator Viewer within the time window allowed by the timer of block 1010.

If affirmative or equivalent at decision block 1020, at block 1025, Bridge Module 1000 may connect Administrator Viewer with Services Module 500 and/or Event or Channel Execution Module 600 through a naked proxy.

If negative or equivalent at decision block 1020, or following block 1025, at block 1099, Bridge Module 1000 may conclude or may return to a process which may have called it.

Figure 11:
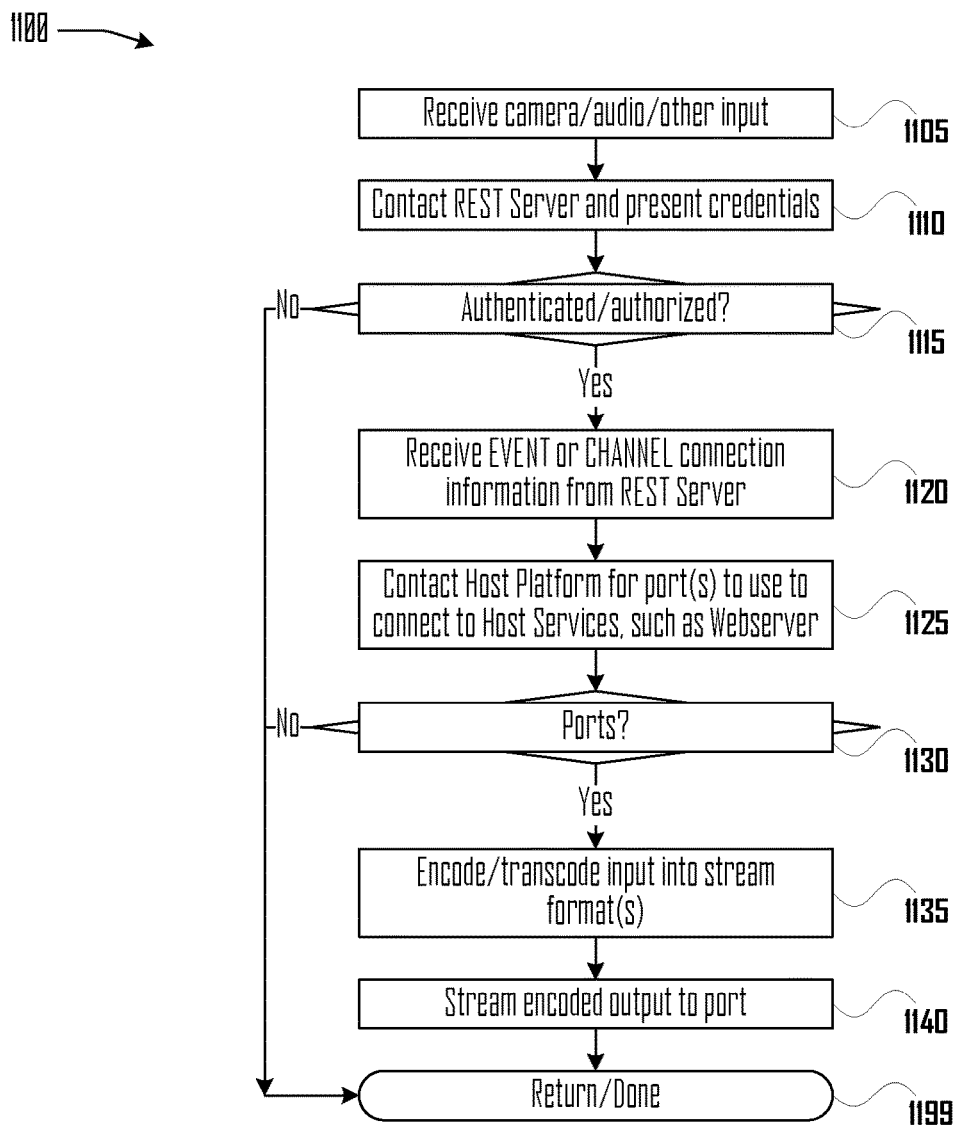
FIG. 11 is a flow diagram illustrating an example of a method performed by a Hardware Encoder Module, according to some embodiments.

FIG. 11 is a flow diagram illustrating an example of a method performed by Hardware Encoder Module 1100, according to some embodiments. In embodiments, Hardware Encoder Module 1100 may be performed by, for example, Hardware Encoder 175. In embodiments, Hardware Encoder 175 may be within Host Platform 112 and may connect to and use Host Services of Host Station 200. Performance of Hardware Encoder Module 1100 may be in addition to or substitute for performance of Event or Channel Execution Module 600. Hardware Encoder 175 may be used, for example, in situations in which selection of Device Media by an Administrator is not required. Hardware Encoder 175 may be used in situations where a media stream input into the Hardware Encoder 175 is to be streamed as a Media Stream to properly configured Decoder Computer 110 devices.

At block 1105, Hardware Encoder Module 1100 may receive High-Definition Multimedia Interface ("HDMI") input from, for example, a device a camera, a microphone, or the like. The device may be connected to Hardware Encoder 175 through or by an HDMI connection, a Universal Serial Bus ("USB") connection, or the like.

At block 1110, Hardware Encoder Module 1100 may contact a REST Server in the Authentication Server Network and present credentials. The credentials may comprise, for example, an identifier of Hardware Encoder 175, Hardware Encoder Module 1100, an Event or Channel identifier, a password, and the like.

At decision block 1115, Hardware Encoder Module 1100 may determine whether the Authentication Server or REST Server has authenticate and/or authorized the Hardware Encoder Module 1100 relative to credentials presented at block 1110.

If affirmative or equivalent at decision block 1115, at block 1120, Hardware Encoder Module 1100 may receive Event or Channel connection information for the Streaming Server 125 from Authentication Server or REST Server network. The Event or Channel connection information may comprise, for example, an Event or Channel GUID 330, an identifier, address, capacity of, or the like, for a Streaming Server 125.

At block 1125, Hardware Encoder Module 1100 may contact Host Station 200 and Network Module 400 therein to obtain port(s) to use to stream media to Host Services, such as Webserver. From the view of Network Module 400, blocks 460 to 495 may iterate over contacts, such as by Hardware Encoder Module 1100, to assign ports.

At decision block 1130, Hardware Encoder Module 1100 may determine whether port(s) have been assigned to Hardware Encoder Module 1100.

If affirmative or equivalent at decision block 1130, at block 1135, Hardware Encoder Module 1100 may encode or transcode the HDMI input into media coding format(s), such as for example, H.264, HEVC, VP8 or VP9 or the like and may assemble the stream(s) in container "bitstreams", such as MP4, FLV, WebM, ASF, or ISMA. The bitstream may be delivered using a transport protocol, such as Real-Time Messaging Protocol ("RTMP"), Real-Time Transport Protocol ("RTP"), or via non-proprietary formats such as Dynamic Adaptive Streaming over HTTP ("MPEG-DASH").

At block 1140, Hardware Encoder Module 1100 may stream the encoded output to the assigned port. Thereafter, another module, Host Server, such as the Webserver, or the like may stream the media of block 1105 to the Streaming Server.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions. USB (Universal serial bus) may comply or be compatible with Universal Serial Bus Specification, Revision 2.0, published by the Universal Serial Bus organization, Apr. 27, 2000, and/or later versions of this specification, for example, Universal Serial Bus Specification, Revision 3.1, published Jul. 26, 2013. PCIe may comply or be compatible with PCI Express 3.0 Base specification, Revision 3.0, published by Peripheral Component Interconnect Special Interest Group (PCI-SIG), November 2010, and/or later and/or related versions of this specification.

As used herein, "social network service" is an online platform used by humans and organization to build social networks or social relations among humans and organizations who share similar personal or career interests, activities, backgrounds or real-life connections.

As used in any embodiment herein, the term "logic" may refer to the logic of the instructions of an app, software, and/or firmware, and/or the logic embodied into a programmable circuitry by a configuration bit stream, to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as FPGA. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

As used herein, the term "module" (or "logic") may refer to, be part of, or include an Application Specific Integrated Circuit (ASIC), a System on a Chip (SoC), an electronic circuit, a programmed programmable circuit (such as, Field Programmable Gate Array (FPGA)), a processor (shared, dedicated, or group) and/or memory (shared, dedicated, or group) or in another computer hardware component or device that execute one or more software or firmware programs having executable machine instructions (generated from an assembler and/or a compiler) or a combination, a combinational logic circuit, and/or other suitable components with logic that provide the described functionality. Modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

As used herein, a process corresponds to an instance of a program, e.g., an application program, executing on a processor and a thread corresponds to a portion of the process. A processor may include one or more execution core(s). The processor may be configured as one or more socket(s) that may each include one or more execution core(s).

Example 1

An encoding apparatus to create a flexible host platform to provide media streaming services, the encoding apparatus comprising: a computer processor and memory; a network module and a streaming service module stored in the memory and executed by the computer processor; wherein the encoding apparatus is to create the flexible host platform by causing the network module to create a network and to dynamically control connection by service clients with the streaming service module through the network, wherein the service clients comprise a media source; and wherein the encoding apparatus is to further to create the flexible host platform by causing the streaming service module to receive a device media from the media source, configure a streaming server to stream from a streaming server endpoint a media stream corresponding to the device media, and configure a hierarchical authorization server network to authenticate a viewer device to obtain to the media stream from the streaming server endpoint.

Example 2

The encoding apparatus according to Example 1, wherein the viewer device is one of an administrator viewer device or an end user viewer device.

Example 3

The encoding apparatus according to Example 2, wherein the viewer device is the administrator viewer device, the media source is a first media source, the device media is a first device media, the service clients comprise the first media source and a second media source, and wherein the encoding apparatus is further to create the flexible host platform by causing the streaming service module to stream the first device media and a second device media to the streaming server, cause the administrator viewer device to receive from the streaming server one or more administrator media streams comprising the first device media and the second device media, and receive a selection from the administrator viewer device of either the first device media or the second device media in the administrator media stream to be the media stream to be streamed from the streaming server endpoint.

Example 4

The encoding apparatus according to Example 3, wherein the one or more administrator media streams further comprise the media stream.

Example 5

The encoding apparatus according to Example 4, wherein the streaming services module is further to receive an instruction from the administrator viewer device to release a Uniform Resource Identifier (URI) of or associated with the steaming server endpoint to enable the end user viewer device to receive the media stream from the streaming server endpoint.

Example 6

The encoding apparatus according to Example 1, wherein to create the network and dynamically control connection by service clients with the streaming service module through the network, the network module is to use a first network interface to create a first LAN in pass-through mode, is to connect the first LAN to an external network, is to use a second network interface to create a second LAN, is to connect the second LAN to the first LAN, and is to configure the second LAN to provide domain name addressing services and dynamic host control protocol services to members of the first LAN, wherein the streaming service module is a member of the first LAN, wherein the streaming service module is thereby discoverable on the first LAN, wherein the network comprises the first and second LANs, and wherein the network module thereby dynamically controls connection of service clients to the streaming service module using the domain name addressing services and dynamic host control protocol services.

Example 7

The apparatus according to Example 6, wherein at least one of the first LAN and the second LAN is a wireless LAN.

Example 8

The apparatus according to Example 3, wherein the administrator viewer device is in an external network and is to control the streaming services module through a remote desktop connection with a remote desktop module of the encoding apparatus.

Example 9

The encoding apparatus according to Example 8, wherein the remote desktop connection is enabled by a remote bridge computer after the streaming services module presents an event or channel identifier associated with a GUID or the GUID and an event or channel credential to the remote bridge computer and the administrator viewer device presents the event or channel identifier associated with the GUID or the GUID and the event or channel credential to the remote bridge computer.

Example 10

The encoding apparatus according to Example 1, wherein the encoding apparatus further comprises a webserver module, and the streaming service module is further to stream the device media to the streaming server with the webserver module.

Example 11

The encoding apparatus according to Example 10, wherein the streaming server is external to the network and the webserver module is internal to the network.

Example 12

The encoding apparatus according to Example 11, wherein the webserver module is a member of the network and obtains domain name addressing services and dynamic host control protocol services from the network module.

Example 13

The encoding apparatus according to Example 1, wherein the hierarchical authorization server network is a tiered representational state transfer (REST) server network.

Example 14

The encoding apparatus according to Example 1, wherein the hierarchical authorization server network comprises a plurality of authorization servers in a hierarchical relationship, wherein the streaming services module establishes credentials in a top level authorization server to authenticate the viewer device to obtain to the media stream from the streaming server endpoint and wherein a lower level authorization server has delegated authentication and authorization authority.

Example 15

The encoding apparatus according to Example 14, wherein the encoding apparatus comprises the top level authorization server.

Example 16

The encoding apparatus according to Example 14, wherein the top level authorization server is configured to determine or obtain an event or channel GUID associated with the media stream in coordination with the streaming server, associate an event or channel name with an event or channel credentials, transmit the event or channel GUID to a requestor in response to authentication and authorization of credentials of the requestor and the event or channel name and event or channel credentials.

Example 17

The encoding apparatus according to Example 14, wherein the lower level authorization server performs an additional service, wherein the additional service comprises at least one of soliciting or accepting a reservation to render the video stream, charging a fee to render the video stream, and sending an invitation to render the video stream.

Example 18

The encoding apparatus according to Example 1, wherein the media source comprises at least one of a microphone or a camera and the device media comprises at least one of an audio stream or a video stream.

Example 19

The encoding apparatus according to Example 1, wherein the media source is to connect to the streaming service module using a real-time messaging protocol.

Example 20

The encoding apparatus according to Example 1, wherein the viewer device is to instruct the streaming service module to record the device media in the memory by the computer processor.

Example 21

The encoding apparatus according to Example 1, wherein the viewer device is an end user viewer device and wherein the end user viewer device is to record the media stream locally to the end user viewer device in a fidelity, wherein the fidelity is the same fidelity in which the media stream is streamed to the end user viewer device from the streaming server endpoint.

Example 22

A method to create a flexible host platform to provide media streaming services, comprising: with a computer processor and memory, creating a network and to dynamically controlling connection by service clients with the network, wherein the service clients comprise a media source, receiving a device media from the media source, configuring a streaming server to stream from a streaming server endpoint a media stream corresponding to the device media, and configuring a hierarchical authorization server network to authenticate a viewer device to obtain to the media stream from the streaming server endpoint.

Example 23

The method according to Example 22, wherein the viewer device is one of an administrator viewer device or an end user viewer device.

Example 24

The method according to Example 23, wherein the viewer device is the administrator viewer device, the media source is a first media source, the device media is a first device media, the service clients comprise the first media source and a second media source, and further comprising streaming the first device media and a second device media to the streaming server, causing the administrator viewer device to receive from the streaming server one or more administrator media streams comprising the first device media and the second device media, receiving a selection from the administrator viewer device of either the first device media or the second device media in the administrator media stream, and causing the selection from the administrator viewer device to be streamed from the streaming server endpoint as the media stream.

Example 25

The method according to Example 24, wherein the one or more administrator media streams further comprise the media stream.

Example 26

The method according to Example 25, further comprising receiving an instruction from the administrator viewer device to release a Uniform Resource Identifier (URI) of or associated with the steaming server endpoint to enable the end user viewer device to receive the media stream from the streaming server endpoint.

Example 27

The method according to Example 22, further comprising creating the network by using a first network interface to create a first LAN in pass-through mode, connecting the first LAN to an external network, using a second network interface to create a second LAN, connecting the second LAN to the first LAN, and configuring the second LAN to provide domain name addressing services and dynamic host control protocol services to members of the first LAN, wherein the network comprises the first and second LANs, and wherein dynamically controlling connection of service clients using the domain name addressing services and dynamic host control protocol services is enabled because members of the first LAN are thereby discoverable.

Example 28

The method to Example 27, wherein at least one of the first LAN and the second LAN is a wireless LAN.

Example 29

The method according to Example 24, wherein the administrator viewer device is in an external network and further comprising receiving the selection from the administrator viewer device of either the first device media or the second device media in the administrator media stream through a remote desktop connection with the administrator viewer device.

Example 30

The method according to Example 29, further comprising enabling the remote desktop connection with a remote bridge computer, wherein enabling the remote desktop connection with a remote bridge computer comprises presenting to the remote bridge computer an event or channel identifier associated with a GUID or the GUID and an event or channel credential and the remote bridge computer forming the remote desktop connection after the administrator viewer device presents the event or channel identifier associated with the GUID or the GUID and the event or channel credential to the remote bridge computer.

Example 31

The method according to Example 22, further comprising streaming the device media to the streaming server with a webserver module.

Example 32

The method according to Example 31, wherein the streaming server is external to the network and the webserver module is internal to the network.

Example 33

The method according to Example 32, wherein the webserver module is a member of the network and obtains domain name addressing services and dynamic host control protocol services from the network module.

Example 34

The method according to Example 22, wherein the hierarchical authorization server network is a tiered representational state transfer (REST) server network.

Example 35

The method according to Example 22, wherein the hierarchical authorization server network comprises a plurality of authorization servers in a hierarchical relationship, and further comprising establishing credentials in a top level authorization server to authenticate the viewer device to obtain to the media stream from the streaming server endpoint and delegating authentication and authorization authority to a lower level authorization server.

Example 36

The method according to Example 35, further comprising, with the top level authorization server, determining or obtaining an event or channel GUID associated with the media stream, associating an event or channel name with an event or channel credentials and transmitting the event or channel GUID to a requestor in response to authentication and authorization of credentials of the requestor and the event or channel name and event or channel credentials.

Example 37

The method according to Example 35, further comprising performing an additional service with the lower level authorization server, wherein the additional service comprises at least one of soliciting or accepting a reservation to render the video stream, charging a fee to render the video stream, and sending an invitation to render the video stream.

Example 38

The method according to Example 22, wherein the media source comprises at least one of a microphone or a camera and the device media comprises at least one of an audio stream or a video stream.

Example 39

The method according to Example 22, further comprising connecting to the media source using a real-time messaging protocol.

Example 40

The method according to Example 22, further comprising receiving a request from the viewer device to record the device media in the memory.

Example 41

The method according to Example 22, wherein the viewer device is an end user viewer device and further comprising recording the media stream locally to the end user viewer device in a fidelity, wherein the fidelity is the same fidelity in which the media stream is streamed to the end user viewer device from the streaming server endpoint.

Example 42

A computer apparatus to create a flexible host platform to provide media streaming services, comprising: means to create a network and to dynamically control connection by service clients with the network, wherein the service clients comprise a media source, means to receive a device media from the media source, means to configure a streaming server to stream from a streaming server endpoint a media stream corresponding to the device media, and means to configure a hierarchical authorization server network to authenticate a viewer device to obtain to the media stream from the streaming server endpoint.

Example 43

The computer apparatus according to Example 42, wherein the viewer device is one of an administrator viewer device or an end user viewer device.

Example 44

The computer apparatus according to Example 43, wherein the viewer device is the administrator viewer device, the media source is a first media source, the device media is a first device media, the service clients comprise the first media source and a second media source, and further comprising means to stream the first device media and a second device media to the streaming server, means to cause the administrator viewer device to receive from the streaming server one or more administrator media streams comprising the first device media and the second device media, means to receive a selection from the administrator viewer device of either the first device media or the second device media in the administrator media stream, and means to cause the selection from the administrator viewer device to be streamed from the streaming server endpoint as the media stream.

Example 45

The computer apparatus according to Example 44, wherein the one or more administrator media streams further comprise the media stream.

Example 46

The computer apparatus according to Example 45, further comprising means to receive an instruction from the administrator viewer device to release a Uniform Resource Identifier (URI) of or associated with the steaming server endpoint to enable the end user viewer device to receive the media stream from the streaming server endpoint.

Example 47

The computer apparatus according to Example 42, further comprising means to create the network using a first network interface to create a first LAN in pass-through mode, means to connect the first LAN to an external network, means to use a second network interface to create a second LAN, means to connect the second LAN to the first LAN, and means to configure the second LAN to provide domain name addressing services and dynamic host control protocol services to members of the first LAN, wherein the network comprises the first and second LANs, and wherein means to dynamically control connection of service clients using the domain name addressing services and dynamic host control protocol services allows members of the first LAN to thereby be discoverable.

Example 48

The computer apparatus to Example 47, wherein at least one of the first LAN and the second LAN is a wireless LAN.

Example 49

The computer apparatus according to Example 44, wherein the administrator viewer device is in an external network and further comprising means to receive the selection from the administrator viewer device of either the first device media or the second device media in the administrator media stream through a remote desktop connection with the administrator viewer device.

Example 50

The computer apparatus according to Example 49, further comprising means to enable the remote desktop connection using a remote bridge computer, wherein means to enable the remote desktop connection using the remote bridge computer comprises means for the computer apparatus to present to the remote bridge computer an event or channel identifier associated with a GUID or the GUID and an event or channel credential and means for the remote bridge computer to form the remote desktop connection with the administrator viewer device after the administrator viewer device presents the event or channel identifier associated with the GUID or the GUID and the event or channel credential to the remote bridge computer.

Example 51

The computer apparatus according to Example 42, further comprising means to stream the device media to the streaming server with a webserver module.

Example 52

The computer apparatus according to Example 51, wherein the streaming server is external to the network and the webserver module is internal to the network.

Example 53

The computer apparatus according to Example 52, wherein the webserver module is a member of the network and further comprising means for the webserver module to obtain domain name addressing services and dynamic host control protocol services with respect to the network and to be discoverable thereby.

Example 54

The computer apparatus according to Example 42, wherein the hierarchical authorization server network is a tiered representational state transfer (REST) server network.

Example 55

The computer apparatus according to Example 42, wherein the hierarchical authorization server network comprises a plurality of authorization servers in a hierarchical relationship, and further comprising means to establish credentials in a top level authorization server to authenticate the viewer device to obtain to the media stream from the streaming server endpoint and means to delegate authentication and authorization authority to a lower level authorization server.

Example 56

The computer apparatus according to Example 55, further comprising, with the top level authorization server, means to determine or obtain an event or channel GUID associated with the media stream, means to associate an event or channel name with an event or channel credentials and means to transmit the event or channel GUID to a requestor in response to authentication and authorization of credentials of the requestor and the event or channel name and event or channel credentials.

Example 57

The computer apparatus according to Example 55, further comprising means to perform an additional service with the lower level authorization server, wherein the additional service comprises at least one of soliciting or accepting a reservation to render the video stream, charging a fee to render the video stream, and sending an invitation to render the video stream.

Example 58

The computer apparatus according to Example 42, wherein the media source comprises at least one of a microphone or a camera and the device media comprises at least one of an audio stream or a video stream.

Example 59

The computer apparatus according to Example 42, further comprising means to connect to the media source using a real-time messaging protocol.

Example 60

The computer apparatus according to Example 42, further comprising means to receive a request from the viewer device to record the device media in the memory.

Example 61

The computer apparatus according to Example 42, wherein the viewer device is an end user viewer device and further comprising means to record the media stream locally to the end user viewer device in a fidelity, wherein the fidelity is the same fidelity in which the media stream is streamed to the end user viewer device from the streaming server endpoint.

Example 62

One or more computer readable media comprising instructions that cause a computer device, in response to execution of the instructions by a processor of the computer device, to: create a network and to dynamically control connection by service clients with the network, wherein the service clients comprise a media source, to receive a device media from the media source, to configure a streaming server to stream from a streaming server endpoint a media stream corresponding to the device media, and configure a hierarchical authorization server network to authenticate a viewer device to obtain to the media stream from the streaming server endpoint.

Example 63

The computer readable media according to Example 62, wherein the viewer device is one of an administrator viewer device or an end user viewer device.

Example 64

The computer readable media according to Example 63, wherein the viewer device is the administrator viewer device, the media source is a first media source, the device media is a first device media, the service clients comprise the first media source and a second media source, and wherein the computer readable media is further to cause the computer device to stream the first device media and a second device media to the streaming server, cause the administrator viewer device to receive from the streaming server one or more administrator media streams comprising the first device media and the second device media, receive a selection from the administrator viewer device of either the first device media or the second device media in the administrator media stream, and cause the selection from the administrator viewer device to be streamed from the streaming server endpoint as the media stream.

Example 65

The computer readable media according to Example 64, wherein the one or more administrator media streams further comprise the media stream.

Example 66

The computer readable media according to Example 65, wherein the computer readable media is further to cause the computer device to receive an instruction from the administrator viewer device to release a Uniform Resource Identifier (URI) of or associated with the steaming server endpoint to enable the end user viewer device to receive the media stream from the streaming server endpoint.

Example 67

The computer readable media according to Example 62, wherein the computer readable media is further to cause the computer device to create the network using a first network interface to create a first LAN in pass-through mode, connect the first LAN to an external network, use a second network interface to create a second LAN, connect the second LAN to the first LAN, and configure the second LAN to provide domain name addressing services and dynamic host control protocol services to members of the first LAN, wherein the network comprises the first and second LANs, and wherein dynamic control of connection service clients using the domain name addressing services and dynamic host control protocol services allows members of the first LAN to thereby be discoverable.

Example 68

The computer readable media to Example 67, wherein at least one of the first LAN and the second LAN is a wireless LAN.

Example 69

The computer readable media according to Example 64, wherein the administrator viewer device is in an external network and wherein the computer readable media is further to cause the computer device to receive the selection from the administrator viewer device of either the first device media or the second device media in the administrator media stream through a remote desktop connection with the administrator viewer device.

Example 70

The computer readable media according to Example 69, wherein the computer readable media is further to cause the computer device to present to a remote bridge computer an event or channel identifier associated with a GUID or the GUID and an event or channel credential and for the remote bridge computer to form the remote desktop connection with the administrator viewer device after the administrator viewer device presents the event or channel identifier associated with the GUID or the GUID and the event or channel credential to the remote bridge computer thereby enabling the remote desktop connection using the remote bridge computer.

Example 71

The computer readable media according to Example 62, wherein the computer readable media is further to cause the computer device to stream the device media to the streaming server with a webserver module.

Example 72

The computer readable media according to Example 71, wherein the streaming server is external to the network and the webserver module is internal to the network.

Example 73

The computer readable media according to Example 72, wherein the webserver module is a member of the network and wherein the computer readable media is further to cause the computer device to provide domain name addressing services and dynamic host control protocol services with respect to the network to the webserver module and for the webserver module to thereby be discoverable.

Example 74

The computer readable media according to Example 62, wherein the hierarchical authorization server network is a tiered representational state transfer (REST) server network.

Example 75

The computer readable media according to Example 62, wherein the hierarchical authorization server network comprises a plurality of authorization servers in a hierarchical relationship, and wherein the computer readable media is further to cause the computer device to establish credentials in a top level authorization server to authenticate the viewer device to obtain to the media stream from the streaming server endpoint and to delegate authentication and authorization authority to a lower level authorization server.

Example 76

The computer readable media according to Example 75, wherein the computer readable media is further to cause the computer device to, with the top level authorization server, determine or obtain an event or channel GUID associated with the media stream, associate an event or channel name with an event or channel credentials and transmit the event or channel GUID to a requestor in response to authentication and authorization of credentials of the requestor and the event or channel name and event or channel credentials.

Example 77

The computer readable media according to Example 75, wherein the computer readable media is further to cause the computer device to, with the lower level authorization server, perform an additional service with the lower level authorization server, wherein the additional service comprises at least one of soliciting or accepting a reservation to render the video stream, charging a fee to render the video stream, and sending an invitation to render the video stream.

Example 78

The computer readable media according to Example 62, wherein the media source comprises at least one of a microphone or a camera and the device media comprises at least one of an audio stream or a video stream.

Example 79

The computer readable media according to Example 62, wherein the computer readable media is further to cause the computer device to connect to the media source using a real-time messaging protocol.

Example 80

The computer readable media according to Example 62, wherein the computer readable media is further to cause the computer device to receive a request from the viewer device to record the device media in memory of the computer device.

Example 81

The computer readable media according to Example 62, wherein the viewer device is an end user viewer device and wherein the computer readable media is further to cause the end user viewer device to record the media stream locally to the end user viewer device in a fidelity, wherein the fidelity is the same fidelity in which the media stream is streamed to the end user viewer device from the streaming server endpoint.

The invention claimed is:

1. An encoding apparatus to create a flexible host platform to provide media streaming services, the encoding apparatus comprising: a computer processor and memory; a network module and a streaming service module stored in the memory and executed by the computer processor; wherein the encoding apparatus is to create the flexible host platform by causing the network module to create a network and to dynamically control connection by service clients with the streaming service module through the network, wherein the service clients comprise a media source; and wherein the encoding apparatus is to further to create the flexible host platform by causing the streaming service module to receive a device media from the media source, configure a streaming server to stream from a streaming server endpoint a media stream corresponding to the device media, and configure a hierarchical authorization server network to authenticate a viewer device to obtain to the media stream from the streaming server endpoint; wherein to create the network and dynamically control connection by service clients with the streaming service module through the network, the network module is to use a first network interface to create a first LAN in pass-through mode, is to connect the first LAN to an external network, is to use a second network interface to create a second LAN, is to connect the second LAN to the first LAN, and is to configure the second LAN to provide domain name addressing services and dynamic host control protocol services to members of the first LAN, wherein the streaming service module is a member of the first LAN, wherein the streaming service module is thereby discoverable on the first LAN, wherein the network comprises the first and second LANs, and wherein the network module thereby dynamically controls connection of service clients to the streaming service module using the domain name addressing services and dynamic host control protocol services.

2. The encoding apparatus according to claim 1, wherein the viewer device is one of an administrator viewer device or an end user viewer device.

3. The encoding apparatus according to claim 2, wherein the viewer device is the administrator viewer device, the media source is a first media source, the device media is a first device media, the service clients comprise the first media source and a second media source, and wherein the encoding apparatus is further to create the flexible host platform by causing the streaming service module to stream the first device media and a second device media to the streaming server, cause the administrator viewer device to receive from the streaming server one or more administrator media streams comprising the first device media and the second device media, and receive a selection from the administrator viewer device of either the first device media or the second device media in the administrator media stream to be the media stream to be streamed from the streaming server endpoint, wherein the one or more administrator media streams further comprise the media stream.

4. The encoding apparatus according to claim 3, wherein the streaming services module is further to receive an instruction from the administrator viewer device to release a Uniform Resource Identifier (URI) of or associated with the steaming server endpoint to enable the end user viewer device to receive the media stream from the streaming server endpoint.

5. The encoding apparatus according to claim 1, wherein the hierarchical authorization server network comprises a plurality of authorization servers in a hierarchical relationship, wherein the streaming services module establishes credentials in a top level authorization server to authenticate the viewer device to obtain to the media stream from the streaming server endpoint and wherein a lower level authorization server has been delegated authentication and authorization authority.

6. The encoding apparatus according to claim 5, wherein the lower level authorization server performs an additional service, wherein the additional service comprises at least one of soliciting or accepting a reservation to render the video stream, charging a fee to render the video stream, and sending an invitation to render the video stream.

7. A method to create a flexible host platform to provide media streaming services, comprising: with a computer processor and memory, creating a network and to dynamically controlling connection by service clients with the network, wherein the service clients comprise a media source, receiving a device media from the media source, configuring a streaming server to stream from a streaming server endpoint a media stream corresponding to the device media, and configuring a hierarchical authorization server network to authenticate a viewer device to obtain to the media stream from the streaming server endpoint, further comprising creating the network by using a first network interface to create a first LAN in pass-through mode, connecting the first LAN to an external network, using a second network interface to create a second LAN, connecting the second LAN to the first LAN, and configuring the second LAN to provide domain name addressing services and dynamic host control protocol services to members of the first LAN, wherein the network comprises the first and second LANs, and wherein dynamically controlling connection of service clients using the domain name addressing services and dynamic host control protocol services is enabled because members of the first LAN are thereby discoverable.

8. The method according to claim 7, wherein the viewer device is one of an administrator viewer device or an end user viewer device.

9. The method according to claim 8, wherein the viewer device is the administrator viewer device, the media source is a first media source, the device media is a first device media, the service clients comprise the first media source and a second media source, and further comprising streaming the first device media and a second device media to the streaming server, causing the administrator viewer device to receive from the streaming server one or more administrator media streams comprising the first device media and the second device media, receiving a selection from the administrator viewer device of either the first device media or the second device media in the administrator media stream, and causing the selection from the administrator viewer device to be streamed from the streaming server endpoint as the media stream, wherein the one or more administrator media streams further comprise the media stream.

10. The method according to claim 9, further comprising receiving an instruction from the administrator viewer device to release a Uniform Resource Identifier (URI) of or associated with the steaming server endpoint to enable the end user viewer device to receive the media stream from the streaming server endpoint.

11. The method according to claim 7, wherein the hierarchical authorization server network comprises a plurality of authorization servers in a hierarchical relationship, and further comprising establishing credentials in a top level authorization server to authenticate the viewer device to obtain to the media stream from the streaming server endpoint and delegating authentication and authorization authority to a lower level authorization server, further comprising performing an additional service with the lower level authorization server, wherein the additional service comprises at least one of soliciting or accepting a reservation to render the video stream, charging a fee to render the video stream, and sending an invitation to render the video stream.

12. One or more computer readable media comprising instructions that cause a computer device, in response to execution of the instructions by a processor of the computer device, to: create a network and to dynamically control connection by service clients with the network, wherein the service clients comprise a media source, to receive a device media from the media source, to configure a streaming server to stream from a streaming server endpoint a media stream corresponding to the device media, and configure a hierarchical authorization server network to authenticate a viewer device to obtain to the media stream from the streaming server endpoint, wherein the computer readable media is further to cause the computer device to create the network using a first network interface to create a first LAN in pass-through mode, connect the first LAN to an external network, use a second network interface to create a second LAN, connect the second LAN to the first LAN, and configure the second LAN to provide domain name addressing services and dynamic host control protocol services to members of the first LAN, wherein the network comprises the first and second LANs, and wherein dynamic control of connection service clients using the domain name addressing services and dynamic host control protocol services allows members of the first LAN to thereby be discoverable.

13. The computer readable media according to claim 12, wherein the viewer device is one of an administrator viewer device or an end user viewer device.

14. The computer readable media according to claim 13, wherein the viewer device is the administrator viewer device, the media source is a first media source, the device media is a first device media, the service clients comprise the first media source and a second media source, and wherein the computer readable media is further to cause the computer device to stream the first device media and a second device media to the streaming server, cause the administrator viewer device to receive from the streaming server one or more administrator media streams comprising the first device media and the second device media, receive a selection from the administrator viewer device of either the first device media or the second device media in the administrator media stream, and cause the selection from the administrator viewer device to be streamed from the streaming server endpoint as the media stream, wherein the one or more administrator media streams further comprise the media stream.

15. The computer readable media according to claim 14, wherein the computer readable media is further to cause the computer device to receive an instruction from the administrator viewer device to release a Uniform Resource Identifier (URI) of or associated with the steaming server endpoint to enable the end user viewer device to receive the media stream from the streaming server endpoint.

16. The computer readable media according to claim 12, wherein the hierarchical authorization server network comprises a plurality of authorization servers in a hierarchical relationship, and wherein the computer readable media is further to cause the computer device to establish credentials in a top level authorization server to authenticate the viewer device to obtain to the media stream from the streaming server endpoint and to delegate authentication and authorization authority to a lower level authorization server.

17. The computer readable media according to claim 16, wherein the computer readable media is further to cause the computer device to, with the lower level authorization server, perform an additional service with the lower level authorization server, wherein the additional service comprises at least one of soliciting or accepting a reservation to render the video stream, charging a fee to render the video stream, and sending an invitation to render the video stream.

\* \* \* \* \*